(12) United States Patent
Wang et al.

(10) Patent No.: US 12,487,311 B2
(45) Date of Patent: Dec. 2, 2025

(54) BACKSCATTER-BASED POSITIONING

(71) Applicant: QUALCOMM Incorporated, San Diego, CA (US)

(72) Inventors: Xiaojie Wang, Hillsborough, NJ (US); Jing Sun, San Diego, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 18/060,429

(22) Filed: Nov. 30, 2022

(65) Prior Publication Data
US 2024/0175965 A1    May 30, 2024

(51) Int. Cl.
*G01S 5/00* (2006.01)
*H04L 5/00* (2006.01)
*H04W 24/08* (2009.01)

(52) U.S. Cl.
CPC .......... *G01S 5/0063* (2013.01); *H04L 5/0051* (2013.01); *H04W 24/08* (2013.01)

(58) Field of Classification Search
CPC ... G01S 5/0063; G01S 5/0236; H04L 5/0051; H04L 5/0048; H04L 5/0053; H04L 5/0094; H04L 5/001; H04W 24/08; H04W 64/00; H04W 24/10; H04W 72/23; H04W 92/18; H04W 4/029
USPC ...................................................... 455/456.1
See application file for complete search history.

(56) References Cited

U.S. PATENT DOCUMENTS

| | | | |
|---|---|---|---|
| 11,714,984 B2 * | 8/2023 | Van Dijk | G06K 19/06 340/10.1 |
| 2021/0240273 A1 * | 8/2021 | Kauffmann | G06F 3/017 |
| 2021/0242991 A1 * | 8/2021 | Manolakos | H04L 5/0094 |
| 2023/0006467 A1 * | 1/2023 | Fan | H02J 50/001 |
| 2024/0080114 A1 * | 3/2024 | Barbu | H04B 7/15528 |
| 2024/0163840 A1 * | 5/2024 | Säily | H04L 25/0222 |

FOREIGN PATENT DOCUMENTS

| | | | | |
|---|---|---|---|---|
| CN | 115173896 B | * | 9/2024 | .......... G06K 7/0008 |
| WO | WO-2021155210 A1 | | 8/2021 | |
| WO | WO-2022025808 A1 | | 2/2022 | |
| WO | WO-2022200673 A1 | | 9/2022 | |

OTHER PUBLICATIONS

CN 113495266: Electronic Device, Method for Positioning and Non-transitory Computer Readable Storage Medium (Year: 2021).*
International Search Report and Written Opinion—PCT/US2023/076076—ISA/EPO—Feb. 9, 2024 (2300457WO).

* cited by examiner

*Primary Examiner* — Mong-Thuy T Tran
(74) *Attorney, Agent, or Firm* — QUALCOMM Incorporated

(57) ABSTRACT

This disclosure provides systems, methods, and devices for wireless communication that support backscatter-based positioning. In a first aspect, a method of wireless communication includes transmitting a configuration signal that indicates a tag address of a tag device and a modulation scheme for generation of a backscatter signal. The method also includes transmitting a positioning reference signal (PRS) after transmission of the configuration signal. The method further includes receiving, from the tag device, a backscatter signal based on the modulation scheme and the PRS. Other aspects and features are also claimed and described.

26 Claims, 12 Drawing Sheets

BACKSCATTER-BASED POSITIONING

TECHNICAL FIELD

Aspects of the present disclosure relate generally to wireless communication systems, and more particularly, to backscatter-based positioning. Some features may enable and provide improved communications, including reduced control overhead, efficient resource utilization, improved network access, improved ranging measurements, location determinations, transmission/reception point (TRP) selection, reduced interference, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Radio frequency identification (RFID) systems and devices typically include a reading device, called a reader, and one or more tag devices—e.g., RFID tag devices. A tag device typically includes a wireless microchip used to tag an object for automated identification. However, the use of tag devices has not been has not been applied to current 3GPP technologies and Internet-of-Things (IOT) implementations that may include identification, monitoring, positioning, and tracking, as illustrative, non-limiting examples. Accordingly, use of tag devices applied to current 3GPP technologies, such as coexistence with user equipments (UEs), and infrastructure in frequency bands for current 3GPP technologies has yet to be established. Given the low power and limited processing capabilities of different types of tag devices, incorporation of tag devices with 3GPP technologies presents a variety of complex and technical challenges, such as limiting network congestion, overhead, and interference associated with the use of tag devices with 3GPP technologies.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a tag device. The method includes receiving a configuration signal that indicates a tag address of the tag device and a modulation scheme for generation of a backscatter signal. The method also includes receiving a positioning reference signal (PRS) after receipt of the configuration signal. The method further includes transmitting a backscatter signal based on the modulation scheme and the PRS.

In an additional aspect of the disclosure, an apparatus includes at least one processor and a memory coupled to the at least one processor. The at least one processor is configured to receive a configuration signal that indicates a tag address of the tag device and a modulation scheme for generation of a backscatter signal. The at least one processor is further configured to receive a PRS after receipt of the configuration signal. The at least one processor is further configured to transmit a backscatter signal based on the modulation scheme and the PRS.

In an additional aspect of the disclosure, an apparatus includes means for receiving a configuration signal that indicates a tag address of the tag device and a modulation scheme for generation of a backscatter signal. The apparatus further includes means for receiving a PRS after receipt of the configuration signal. The apparatus further includes means for transmitting a backscatter signal based on the modulation scheme and the PRS.

In an additional aspect of the disclosure, a non-transitory computer-readable medium stores instructions that, when executed by a processor, cause the processor to perform operations. The operations include receiving a configuration signal that indicates a tag address of the tag device and a modulation scheme for generation of a backscatter signal. The operations further include receiving a PRS after receipt of the configuration signal. The operations further include transmitting a backscatter signal based on the modulation scheme and the PRS.

In an additional aspect of the disclosure, a method for wireless communication is performed by a network entity. The method includes transmitting a configuration signal that indicates a tag address of a tag device and a modulation scheme for generation of a backscatter signal. The method further includes transmitting a PRS after transmission of the configuration signal. The method also includes receiving, from the tag device, a backscatter signal based on the modulation scheme and the PRS.

In an additional aspect of the disclosure, an apparatus includes at least one processor and a memory coupled to the at least one processor. The at least one processor is configured to transmit a configuration signal that indicates a tag address of a tag device and a modulation scheme for generation of a backscatter signal. The at least one processor is further configured to transmit a PRS after transmission of the configuration signal. The at least one processor is also configured to receive, from the tag device, a backscatter signal based on the modulation scheme and the PRS.

In an additional aspect of the disclosure, an apparatus includes means for transmitting a configuration signal that indicates a tag address of a tag device and a modulation scheme for generation of a backscatter signal. The apparatus further includes means for transmitting a PRS after transmission of the configuration signal. The apparatus also includes means for receiving, from the tag device, a backscatter signal based on the modulation scheme and the PRS.

In an additional aspect of the disclosure, a non-transitory computer-readable medium stores instructions that, when executed by a processor, cause the processor to perform operations. The operations include transmitting a configuration signal that indicates a tag address of a tag device and a modulation scheme for generation of a backscatter signal. The operations further include transmitting a PRS after transmission of the configuration signal. The operations also include receiving, from the tag device, a backscatter signal based on the modulation scheme and the PRS.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
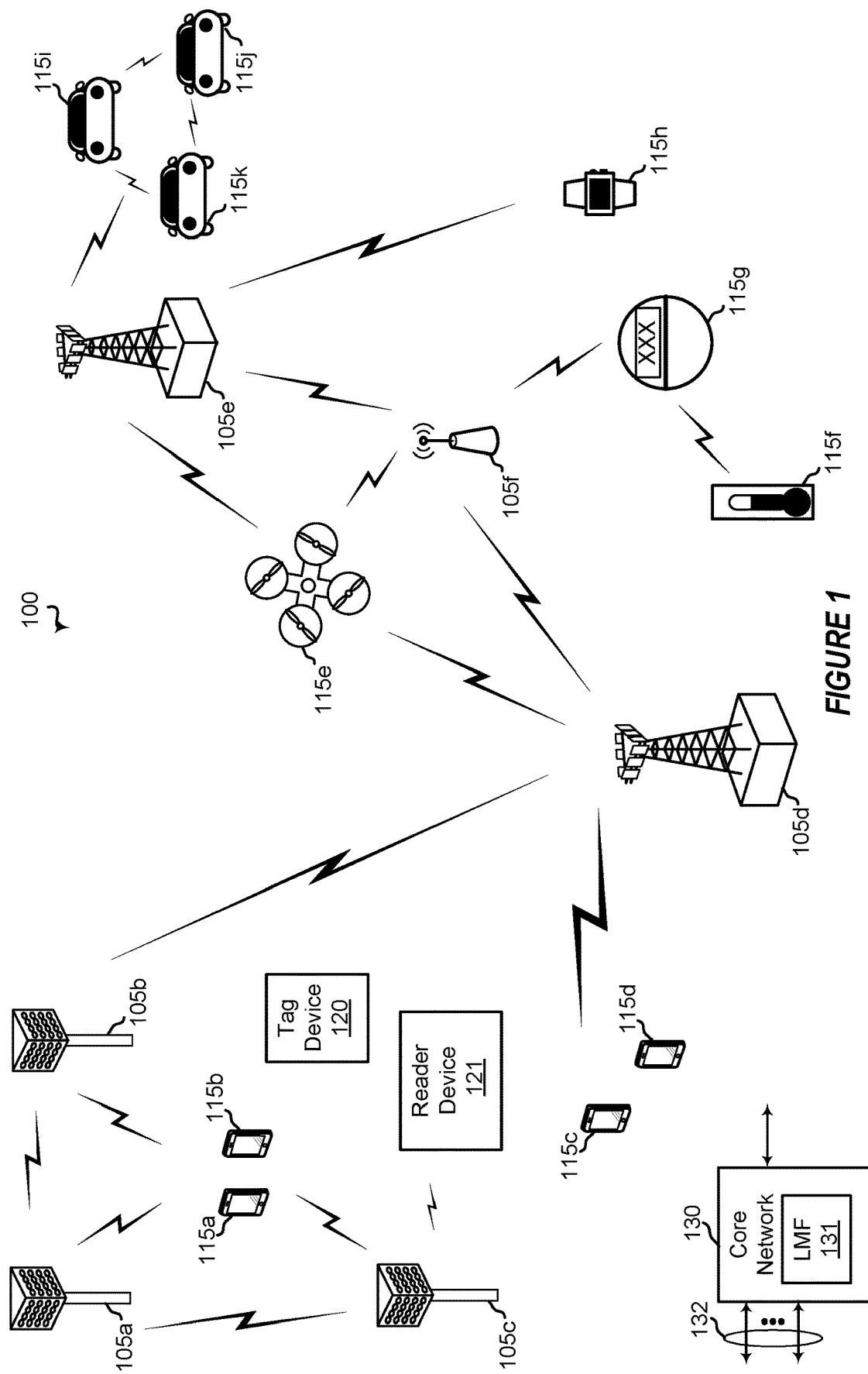
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support backscatter-based positioning. For example, the present disclosure describes positioning of a tag device, such as a passive Internet-of-Things (IOT) device, through backscatter transmission. To illustrate, a network entity, such as a transmission/reception point (TRP), may perform a positioning session (e.g., a ranging session) with the tag device. The network entity may transmit a configuration signal that indicates a tag address (e.g., a tag identifier of the tag device or a group identifier associated with the tag device) of the tag device and a modulation scheme for generation of a backscatter signal. The modulation scheme may indicate a frequency shift parameter, a phase scrambling parameter, an on/off pattern, modulation data, or a combination thereof. The scrambling parameter may include or indicate a scrambling sequence ID form multiplexing data (e.g., the modulation data or predefined data) in a code domain. The frequency shift parameter may include or indicate a frequency shift in a frequency domain. The on/off pattern may include or indicate a pattern or sequence for the tag device to perform backscattering operations or energy harvesting operations. In some implementations, the configuration signal also includes an energy signal configured to be converted into energy by the tag device for energy harvesting by the tag device. After transmitting the configuration signal, the network entity may transmit a positioning reference signal (PRS) of the positioning session. The tag device may receive the PRS, generate a backscatter signal that is modulated based on the modulation scheme, and transmit the backscatter signal. The network entity receives, from the tag device, the backscatter signal based on the modulation scheme and the PRS. The network entity may correlate the backscatter signal and the PRS, determine a round trip time (RTT) based on correlating the backscatter signal and the PRS. A position of the tag device may be determined based on the RTT. In some implementations, the network entity identifies interference in a channel a channel of the backscatter signal after transmitting the PRS. The interference may include self-interference, environmental interference, or a combination thereof. The network entity may update the modulation scheme based on the interference to counteract the interference.

Particular implementations of the subject matter described in this disclosure may be implemented to realize one or more of the following potential advantages or benefits. In some aspects, the present disclosure provides techniques for supporting backscatter-based positioning. The techniques described facilitate determining a position, such as a two dimensional or a three dimensional position, of a tag device that has limited on-board power and computational resources, such as a passive tag device or a semi-passive tag device by providing enhanced techniques for the network entity, such as a TRP, to perform RTT measurements. In particular, the disclosed techniques facilitate performance of RTT measurements even when performing positioning operations of the tag device that have limited on-board power, limited computational resources, operate asynchronously of the TRP, or combinations thereof. These RTT measurements then can be used to determine a position of the tag device.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mm Wave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (CNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IOT) and the like. UEs 115c-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105c.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Tag device systems typically include a tag device 120 and a reader device 121. Tag device 120 includes radio frequency identification (RFID) device or tags that include a wireless microchip used for tagging objects for automated object identification. Reader device 121, such as an RFID reader, may be configured to transmit electromagnetic signals to other devices, such as tag device 120. Reader device 121 may include one or more processors and a memory and is typically able to process data. Additionally, reader device 121 usually includes one or more transmitters and receivers. During typical operation, reader device 121 may be configured to transmit a signal, which is receivable by tag device 120 and to receive and process a signal from tag device 120 that is responsive to the transmitted signal.

Tag devices, such as tag device 120, are categorized based on functionality or capability. For instance, tag device 120 may be categorized as one of a passive tag, a semi-passive tag, and an active tag depending on the functionality or capabilities of tag device 120. Accordingly, tag device 120 may correspond to a passive tag, a semi-passive tag, or an active tag.

Passive tags typically lack a power source, harvest energy from ambient electromagnetic signals, and have limited computational capacity, often lacking components, such as analog to digital converters (ADCs) and digital to analog converters (DACS) for signal processing. Since passive tags generally lack signal processing capability, passive tags typically include a simple circuit to reflect a received electromagnetic signal to the environment in the form of a backscatter transmission. For instance, reader device 121 may transmit an electromagnetic signal that a passive tag, such as tag device 120, may receive and at least partially reflect in the form of a backscatter signal. To elaborate, if tag device 120 is a passive tag then tag device 120 may include circuitry to at least partially reflect non-absorbed portions of electromagnetic signals received from the ambient environment, such as transmitted by reader device 121, in the form of a backscatter transmission.

Semi-passive tags usually include an on-board power source to provide energy for on-board electronic components. In general, semi-passive tags often have more computational power than passive tags. Additionally, semi-passive tags may have a limited on-board power source; however, semi-passive tags typically transmit signals through backscatter transmissions as explained above in the context of passive tags.

Active tags often include an on-board power source and more computational capacity than passive or semi-passive tags. Moreover, unlike passive and semi-passive tags that normally are unable to transmit unless a reader device, such as reader device 121, is in proximity to them, active tags are able to transmit regardless of a proximity of a reader device. Active tag devices typically include signal processing functionality, such as ADCs, DACs, and the like. Moreover, active tags often include a power source and are able to actively transmit. In particular, unlike passive and semi-passive tags that generate a backscatter signal by at least partially reflecting a transmission received from a reader device (e.g., reader device 121), active tags are capable of transmitting independently of a signal received from another device, such as reader device 121.

Additionally, tag devices, such as tag device 120, typically include a tag identification to uniquely identify the tag device. Accordingly, a tag device, such as tag device 121, may include its unique tag identification in response to receipt, at the tag device, of a transmission from reader device 121. If tag device 120 corresponds to a passive tag or a semi-passive tag, tag device 120 may be configured to at least partially reflect the transmission received from reader device 121 in the form of a backscatter signal that is readable by reader device 121. While an active tag is able to process a transmitted signal received from reader device 121, in some implementations, an active tag device may also partially reflect the received signal as a backscatter signal or may independently transmit a signal to reader device 121 in response to a signal received from reader device 121.

Tag device systems that include tag device 120 and reader device 121 may be deployed for positioning an object associated with tag device 120. For instance, tag device 120 may be affixed to an object, and reader device 121 may be configured to identify a position (e.g., a two-dimensional position, a three-dimensional position) of the object to which tag device 120 is affixed through use of backscatter-based positioning. As such, tag device systems can be deployed in a wide range of applications in which precise and accurate object positioning achieved. These applications may include automated checkout, medical application such as monitoring patients' compliance with medical directives, and law enforcement and security applications, as illustrative, non-limiting examples.

Figure 2:
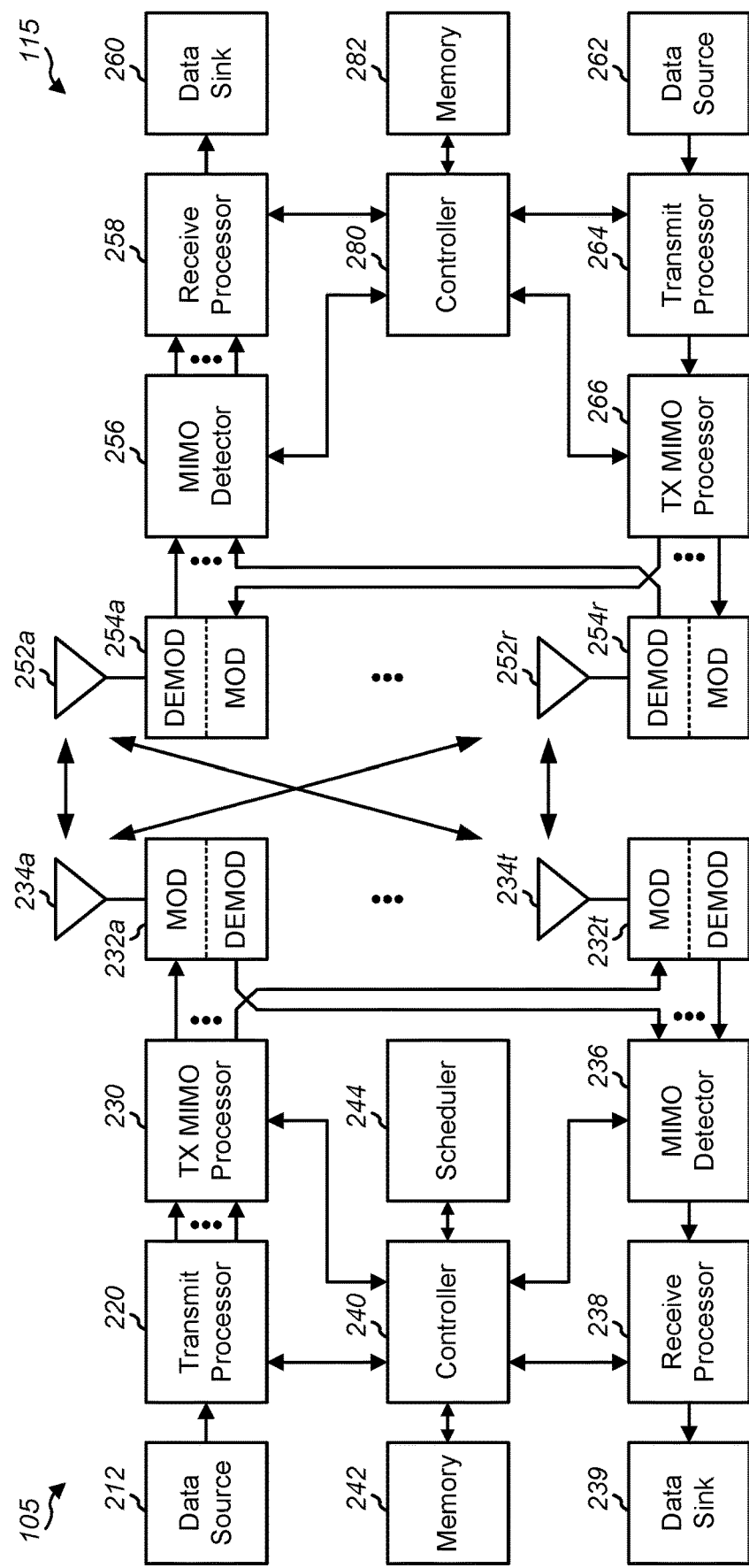
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 11 and 13, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
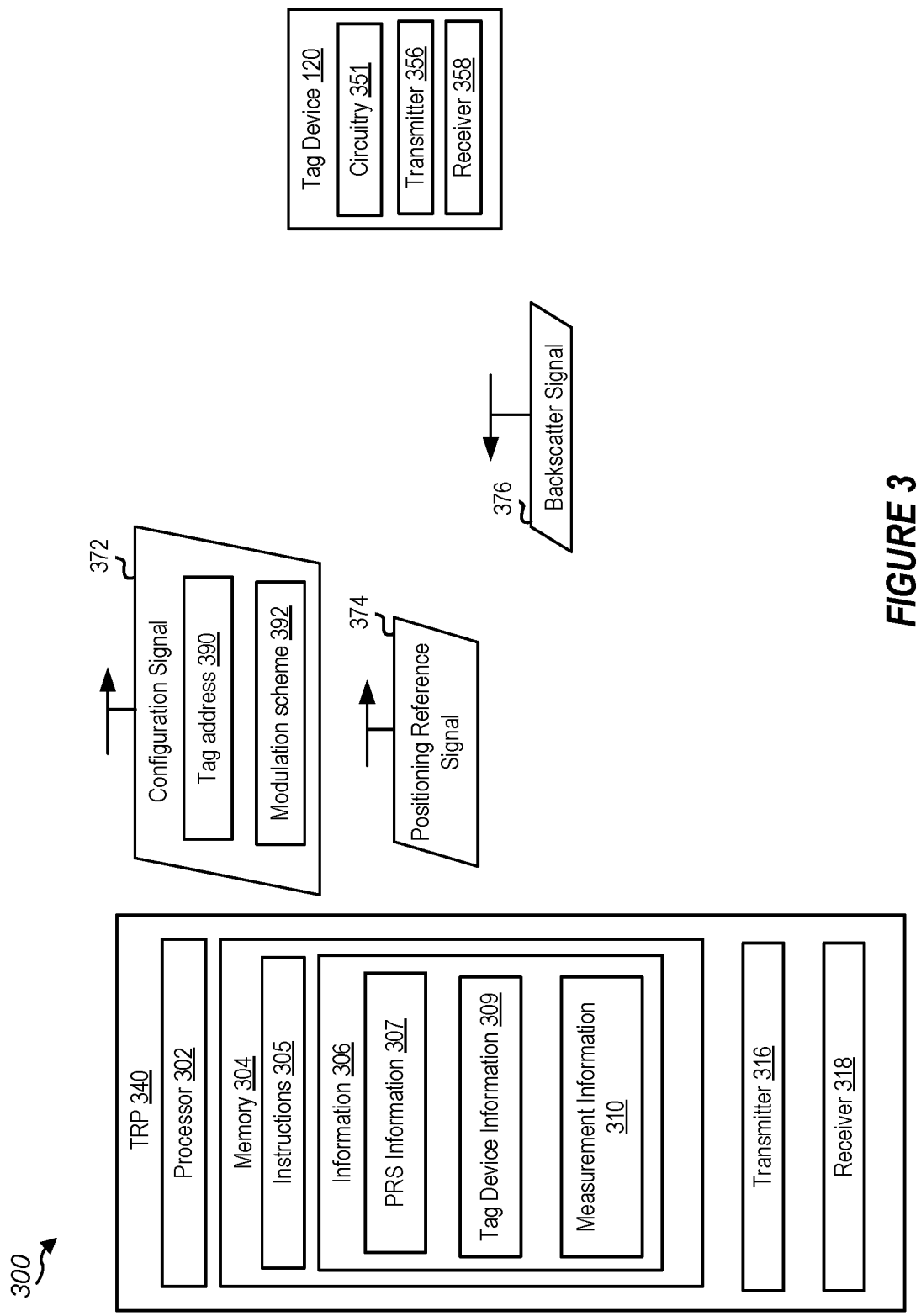
FIG. 3 is a block diagram illustrating an example wireless communication system that supports backscatter-based positioning according to one or more aspects.

FIG. 3 is a block diagram of an example wireless communications system 300 that supports backscatter-based positioning according to one or more aspects. In some examples, wireless communications system 300 may implement aspects of wireless network 100. Wireless communications system 300 includes tag device 120 and TRP 340. Although described as TRP 340, in other implementations, TRP 340 may include or be another device, such as a network entity (e.g., a reader device 121, a base station 105, a UE 115, etc.). Although one TRP and one tag device are illustrated, in some other implementations, wireless communications system 300 may generally include additional TRPs, additional tag devices, or a combination thereof.

Tag device 120 may be a RFID tag device. Additionally, tag device 120 may be a passive tag having no power source and limited computational capacity, a semi-passive tag having a limited power source and computational capacity that is equal to or more extensive than the computational capacity of a passive tag device, or an active tag, having a power source and the same or more extensive computational capacity as that the semi-passive tag device.

Tag device 120 may include a variety of components (such as structural, hardware components) used for carrying out one or more functions described herein. For example, these components may include circuitry 351, transmitter 356, and receiver 358. Circuitry 351 may include or correspond to energy harvesting circuitry, a microcontroller, one or more processors, a memory, an analog-to-digital converter (ADC), a digital to analog converter (DAC), or any combination thereof, as non-illustrative examples. Circuitry 351 may depend on whether tag device 120 is a passive tag, a semi-passive tag, or an active tag.

Transmitter 356 is configured to transmit one or more signals to one or more other devices (e.g., one or more TRPs or reader 121), and receiver 358 is configured to receive one or more signals from one or more other devices (e.g., TRP 340, reader 121, core network 130). For example, transmitter 356 may transmit backscatter signal 376 to one or more TRPs (e.g., TRP 340), and receiver 358 may receive positioning reference signal 374 from one or more TRPs (e.g., TRP 340). In some implementations, transmitter 356 and receiver 358 may be integrated in one or more transceivers. Additionally or alternatively, transmitter 356 or receiver 358 may include or correspond to one or more components of tag device 120.

Tag device 120 may include one or more components as described herein with reference to tag device 120. In some implementations, tag device 120 is a 3GPP-capable tag device, an LTE-capable tag device, a 5G-capable tag device, a 6G-capable tag device, or a combination thereof.

TRP 340 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). In some implementations, TRP 340 may include an interface (e.g., a communication interface) that includes transmitter 316, receiver 318, or a combination thereof. Processor 302 may be configured to execute instructions 305 stored in memory 304 to perform the operations described herein. In some implementations, processor 302 includes or corresponds to one or more of receive processor 238, transmit processor 220, and controller 240, and memory 304 includes or corresponds to memory 242.

Memory 304 includes or is configured to store instructions 305 and information 306. Information 306 may include PRS information 307 and tag device information 309.

PRS information 307 includes information that TRP 340 uses to generate a positioning reference signal (PRS) 374. For example, PRS information 307 may include one or more parameters, such as timing information, a sequence corresponding to PRS 374 (e.g., a wideband sequence, a code-division multiple access-pseudo random (CDMA-PN) sequence), an indication of whether PRS 374 is periodic, a period of PRS 374, or any combination thereof. Additionally or alternatively, the one or more parameters may include a repetition rate, a bandwidth configuration, a comb pattern configuration, or any combination thereof. The repetition rate may include or indicate a number of times within a time period that a PRS is transmitted. The comb pattern may include or indicate a configurable resource block allocation.

Tag device information 309 may include or correspond to information about one or more tag devices, such as tag device 120. For example, tag device information 309 may include a tag address of tag device 120 (corresponding to tag address 390), a modulation scheme for generation, by tag device 120, of backscatter signal 376 (corresponding to modulation scheme 392), or a combination thereof. The tag address may indicate a tag identifier of tag device 120, a group identifier associated with tag device 120, or a combination thereof. The modulation scheme may indicate a frequency shift parameter (e.g., whereby tag device 120 may be configured to shift a frequency of backscatter signal 376), a phase scrambling parameter (whereby tag device 120 may be configured to scramble a phase of backscatter signal 376), an on/off pattern, modulation data (for modulating a backscatter signal), or a combination thereof. The on/off pattern may indicate one or more transitions of the tag device from a first state to a second state or from the second state to the first state. The first state may corresponds to backscatter transmission state (e.g., during which tag device 120 is configured to transmit backscatter signal 376, and the second state may correspond to an energy harvesting state (e.g., during which tag device 120 is configured to generate energy from backscatter signal 376).

Additionally or alternatively, tag device information 309 may include a tag type, a bandwidth, a PRS slot periodicity, a sensitivity, a group delay (e.g., a tag delay), or a combination thereof. A tag type may correspond to whether the tag device (e.g., tag device 120) is a passive tag, a semi-passive tag, or an active tag. Bandwidth may correspond to a bandwidth over which tag device 120 is capable of communicating. PRS slot periodicity may correspond to timeframes during which or how often tag device 120 expects to receive PRS 374. Sensitivity may correspond to a sensitivity of tag device 120 to PRS 374, such as transmit power of the PRS, a distance from a TRP at which tag device 120 can successfully receive a signal, or a combination thereof. Group delay or a tag processing delay may correspond to an amount of time for tag device 120 to process PRS 374 and to generate backscatter signal 376 in response to receipt, at tag device 120, or PRS 374. Stated in a different manner, the tag delay, such as a radio frequency (RF) group delay, may include or be based on one or more components (e.g., circuitry 351, transmitter 356, receiver 358, or a combination thereof, of the tag device. The one or more components are configured to receive a positioning reference signal, generate a backscatter signal based on the positioning reference signal, and transmit the backscatter signal. In some implementations, the tag delay is an amount of time between tag device 120 receiving a positioning reference signal and transmitting a backscatter signal based on the received positioning reference signal.

Measurement information 310 includes or corresponds to propagation times associated with backscatter signal 376. For example, when TRP 340 is configured as a Tx TRP, measurement information 310 may include a transmit time of PRS 374, a receive time of backscatter signal 376, an amount of time that elapses from transmission of PRS 374 to receipt of backscatter signal 376, or a combination thereof. In some implementations when TRP 340 is configured as an Rx TRP, measurement information 310 may include a receive time of PRS 374, a receive time of backscatter signal 376, an amount of time that elapses from receipt of PRS 374 to receipt of backscatter signal 376, or a combination thereof. TRP 340 may be configured to generate a measurement report based on measurement information 310.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, core network 130, another TRP, or a network entity. Additionally, or alternatively transmitter 316 may transmit a positioning reference signal (e.g., 374) and receiver 318 may receive a backscatter signal (e.g., 376). In some implementations, transmitter 316 and receiver 318 may be integrated in one or more transceivers. Additionally or alternatively, transmitter 316 or receiver 318 may include or correspond to one or more components of as described with reference to UE 115 or base station 105 of FIG. 2. In some implementations, transmitter 316 and receiver 318 may be configured to operate in a full duplex mode.

In some implementations, TRP 340 may include one or more antenna arrays. The antenna array may include multiple antenna elements configured to perform wireless communications with other devices, such as with core network 130. In some implementations, the antenna array may be configured to perform wireless communications using different beams, also referred to as antenna beams. The beams may include Tx beams and Rx beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam. In some implementations, TRP 340 may be configured as or include a reader device, such as an RFID reader device. TRP 340 may be configured to operate asynchronously from tag device 120.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP. In some other implementations, wireless communications system 300 implements a 6G network. The disclosure captures use cases of interest not necessarily captured elsewhere in 3GPP, such as identification, tracking, monitoring, and coexistence with UEs and infrastructure in frequency bands for current 3GPP technologies.

In some implementations, a position of tag device 120 may be determined, such as by a network entity—e.g., TRP 340 or LMF 131, based on one or more measurement reports generated by one or more TRPs, such as TRP 340. TRP 340 may generate the measurement report based on measurements, such as roundtrip time (RTT) measurements performed by the one or more TRPs, such as TRP 340. Determining the position of tag device 120 may include calculating a time of arrival (TOA), a time difference of arrival (TDOA), an angle of arrival (AoA), or any combination thereof. Moreover, LMF 131 may be configured to transmit position data that indicates the position of tag device 120.

During operation of wireless communications system 300, TRP 340 may transmit configuration signal 372 that indicates tag address 390 of tag device 120, modulation scheme 392 of tag device 120 for generation of backscatter signal 376, or a combination thereof. Tag address 390 may indicate a tag identifier of tag device 120, a group identifier associated with tag device 120, or a combination thereof. Modulation scheme 392 may indicate a frequency shift parameter, a phase scrambling parameter, an on/off pattern, modulation data, or a combination thereof. In some implementations, configuration signal 372 is a bipartite signal that includes a first component, corresponding to an energy signal, configured to provide energy to tag device 120, and a second component, corresponding to tag configuration data. The tag configuration data may include or correspond to tag address 390 and modulation scheme 392.

tag device 120 may receive configuration signal 372 and may initiate processing of configuration signal 372. In response to determining that tag address 390 corresponds to tag device 120, tag device 120 may generate backscatter signal 376 based on modulation scheme 392. However, if tag device 120 determines that tag address 390 does not correspond to tag device 120, tag device 120 may ignore configuration signal 372.

In some implementations, configuration signal 372 may be a bipartite signal having an first energy signal component and a second configuration component that includes tag address 390 and modulation scheme 392. In such a case, upon receipt of configuration signal 372, tag device may be configured to generate (e.g., extract) energy based on the energy signal and may process one or more of the tag address 390 and modulation scheme 392 as previously described herein.

TRP 340 may transmit PRS 374 after transmission of configuration signal 372. TRP 340 may receive, from tag device 120, backscatter signal 376 based on modulation scheme 392 included in configuration signal 372. For example, in response to receipt, at tag device 120, of PRS 374, tag device 120 may be configured to generate and transmit backscatter signal 376 in accordance with modulation scheme 392.

Tag device 120 may receive PRS 374 after receipt of configuration signal 372. Thereafter, tag device 120 may transmit backscatter signal 376 based on modulation scheme 392 and PRS 374. In some implementations, transmission of backscatter signal 376 occurs after conclusion of a tag processing delay period, such as a timeframe during which tag device 120 processes PRS 374 and modulation scheme 392 to generate backscatter signal 376. In some implementations, tag device 120 modulates, based on modulation scheme 392, PRS 374 with modulation data to generate backscatter signal 376. Modulation data may include or correspond to data included in modulation scheme 392.

Figure 6:
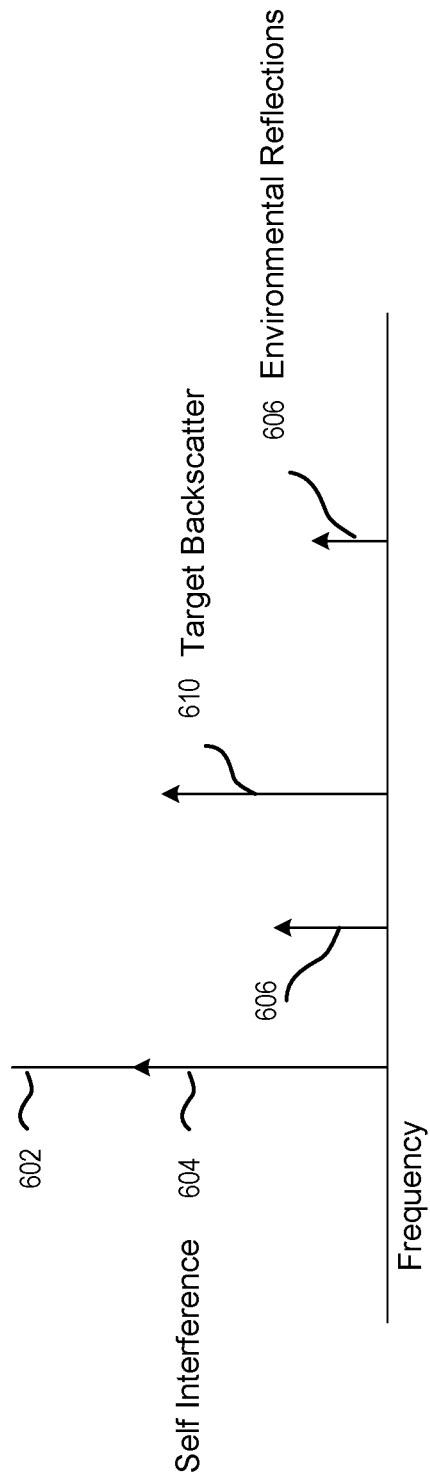
FIG. 6 is a conceptual diagram depicting interference at a transmission/reception point (TRP) in one or more aspects.

TRP may receive backscatter signal 376 and correlate backscatter signal 376 and PRS 374 as explained further herein at least with reference of FIG. 6. Based on correlating backscatter signal 376 and PRS 374, TRP 340 may determine an RTT of PRS 374 and backscatter signal 376. The RTT may include or correspond to a sum of a first amount of time of PRS 374 to travel from TRP 340 to tag device 120 and a second amount of time for backscatter signal 376 to travel from tag device 120 to TRP 340.

In some implementations, a TRP, such as TPR 340, transmits a configuration signal, such as configuration signal 372, that indicates a modulation scheme, such as modulation scheme 392, for generation of backscatter signal 376. Tag device 120 may receive the configuration signal and may process modulation data corresponding to or included in the modulation scheme. For example, the modulation data may include a symbol pattern to be modulated onto the PRS (e.g., PRS 374), by the tag device, to generate the backscatter signal, such as backscatter signal 376. In this manner, when the backscatter signal is reflected back to the TRP, the TRP may detect the symbol pattern corresponding to the modulation data.

In some implementations, after transmission of PRS 374, the TRP receives an unmodulated reflected backscatter signal from the tag device, which the TRP may use to assess self-interference, environmental interference, or a combination thereof in the reflected but unmodulated backscatter signal. However, after a time delay at the tag device, attributable, in some cases, to processing the PRS, the tag device may modulate the PRS with the modulation data and may reflect the modulated PRS, corresponding to the backscatter signal. The TRP may receive the backscatter signal (e.g., the PRS modulated with modulation data) and may correlate the transmitted PRS with the received backscatter signal to determine a RTT corresponding to the transmitted PRS and the received backscatter signal. For example, the correlation may include comparing, by the TRS, a first time at which one or more symbols of the PRS is transmitted with a second time at which one or more symbols of the backscatter signal (e.g., the PRS modulated with modulation data) is received. Based on the foregoing comparison, the TRP may be configured to determine a RTT. The RTT may correspond to a sum of a first amount of time during which the PRS travels from the TRP to the tag device and a second amount of time during which the backscatter signal (e.g., the PRS modulated with the modulation data) travels from the tag device to the TRP. In this manner, the TRP may determine the RTT even though the TRP and tag device operate asynchronously of one another.

In some implementations, to determine a RTT, TRP 340 detects a backscatter signal, such as backscatter signal 376, including or corresponding to PRS modulated with the modulation data, and compares a first time at which TRP 340 receives the backscatter signal and a second time at which TRP 340 transmits the PRS to determine the RTT. To elaborate, mathematically, the PRS (e.g., PRS 374) may correspond to signal c(t). Backscatter signal (e.g., PRS modulated with modulation data), received at the TRP, such as TRP 340, may correspond to $c(t-t_c)b(t-t_p)$ in which $c(t-t_c)$ corresponds to the PRS component of the backscatter signal and $b(t-t_p)$ corresponds to modulation data modulated onto the PRS. The backscatter signal, such as backscatter signal 376, received at the TRP (e.g., TRP 340) may, mathematically, correspond to $r(t)=h_c c(t)+h_b c(t-t_c)b(t-t_p)+\Sigma_i h_i c(t-t_i)$, where r(t) denotes the backscatter signal received at the TRP, $h_c$ denotes a self-interference channel gain, $h_b$ denotes a backscatter channel gain, $t_c$ includes or corresponds to the RTT, and $t_b$ includes or corresponds to an unknown time delay associated with the modulation data. In the foregoing equation, $h_c c(t)$ may include or correspond to self-interference attributable to transmission of the PRS and experienced by TRP when in a Rx mode, $\Sigma_i h_i c(t-t_i)$ may include or correspond to interference attributable to environmental factors, such as objects in a vicinity of the tag device, and experienced by TRP when in the Rx mode. As described further herein, the disclosed technique facilitates determination of $t_c$.

As described with reference to FIG. 3, the present disclosure provides techniques for supporting backscatter-based positioning of one or more tag devices, such as tag device 120. The techniques described facilitate determining a position, such as a two dimensional or a three dimensional position, of a tag device, such as tag device 120, that has limited on-board power and computational resources (e.g., a passive or semi-passive tag) by providing enhanced techniques for a TRP, such as TRP 340, to perform round trip time (RTT) measurements. In particular, the disclosed techniques facilitate performance, by a TRP, of RTT measurements even when performing positioning operations on a tag device, such as tag device 120, that have limited on-board power, limited computational resources, operate asynchronously of the TRP, or combinations thereof. These RTT measurements then can be used to determine a position of the tag device.

Figure 4:
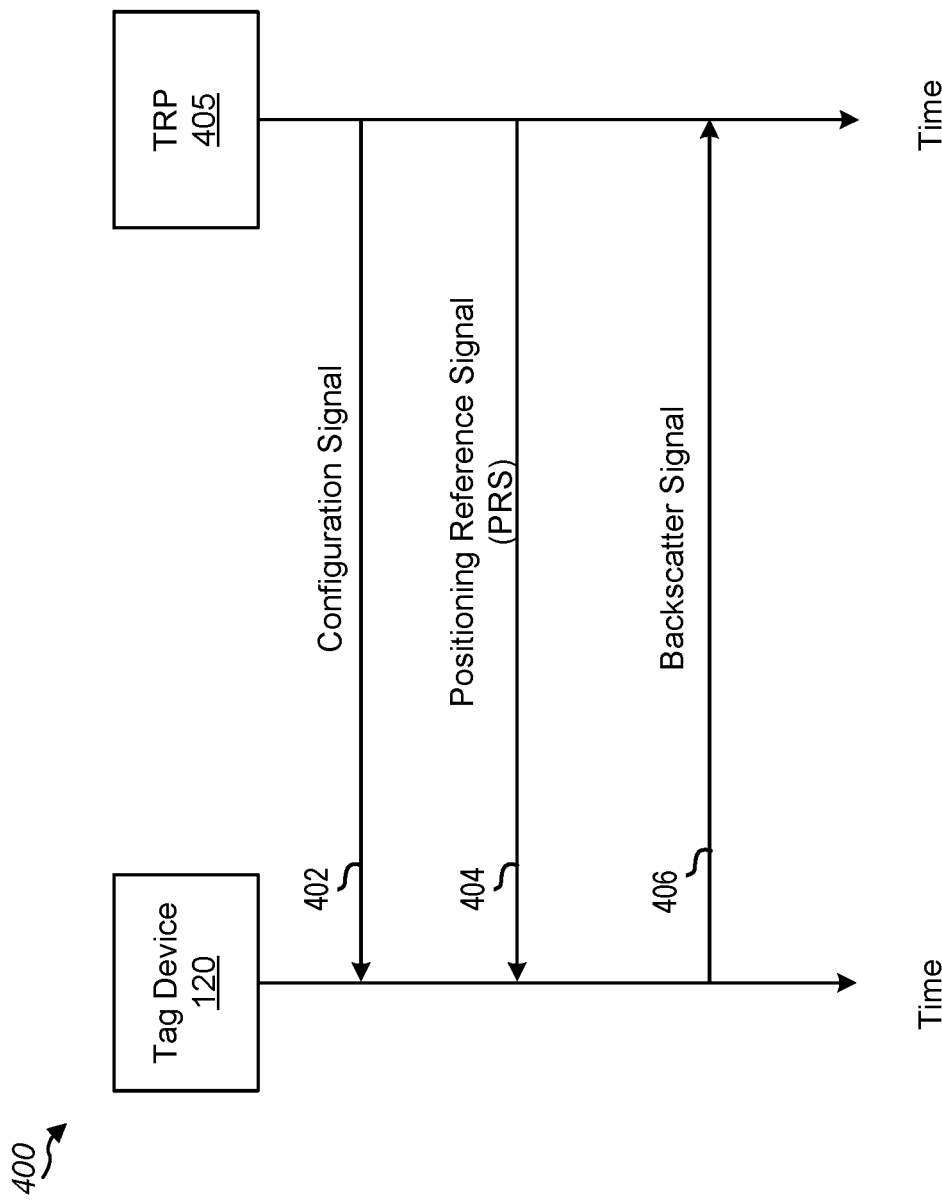
FIG. 4 is a ladder diagram illustrating an example of backscatter-based positioning according to one or more aspects.

FIG. 4 is a ladder diagrams illustrating an example of backscatter based positioning according to aspects of the present disclosure. As shown in FIG. 4, a system 400 of the ladder diagram of FIG. 4 includes tag device 120 and TRP 405. Tag device 120 may correspond to a passive or semi-passive tag device. Additionally or alternatively, tag device 120 may correspond to an active tag device operating a reflection mode rather than in an active transmission mode. TRP 405 may correspond to a Tx/Rx TRP operating in a full duplex mode.

At 402, TRP 405 may transmit a configuration signal, such as configuration signal 372, to tag device 120. Subsequently, at 404, TRP 405 may transmit a PRS, such as PRS 374, to tag device 120. Thereafter, at 406, TRP may receive backscatter signal 406 from tag device 120.

In some implementations and referring to 404, the backscatter signal received at TRP 405 may be bipartite. A first part of the backscatter signal may include or correspond to the PRS reflected back to TRP 405 by tag device 120 without modulation but possibly with interference. Interference may include self-interference attributable to TRP 405, interference from environmental sources, such as reflections from objects in a vicinity of tag device 120, or combinations thereof, as explained further herein at least with reference to FIG. 6.

A second part of the backscatter signal may include or correspond to the PRS modulated with modulation data, such as indicated to tag device by a modulation scheme (e.g., modulation scheme 392) included in the configuration signal. In some implementations, the backscatter signal received at TRP 405 only may have a single part that includes or corresponds to the PRS modulated with modulation data. Regardless, TRP 405 may use the backscatter signal that includes PRS modulated with the modulation data to determine a RTT as explained above and as further explained with reference to FIG. 7, notwithstanding asynchronous operation of tag device and TRP 405.

Figure 5:
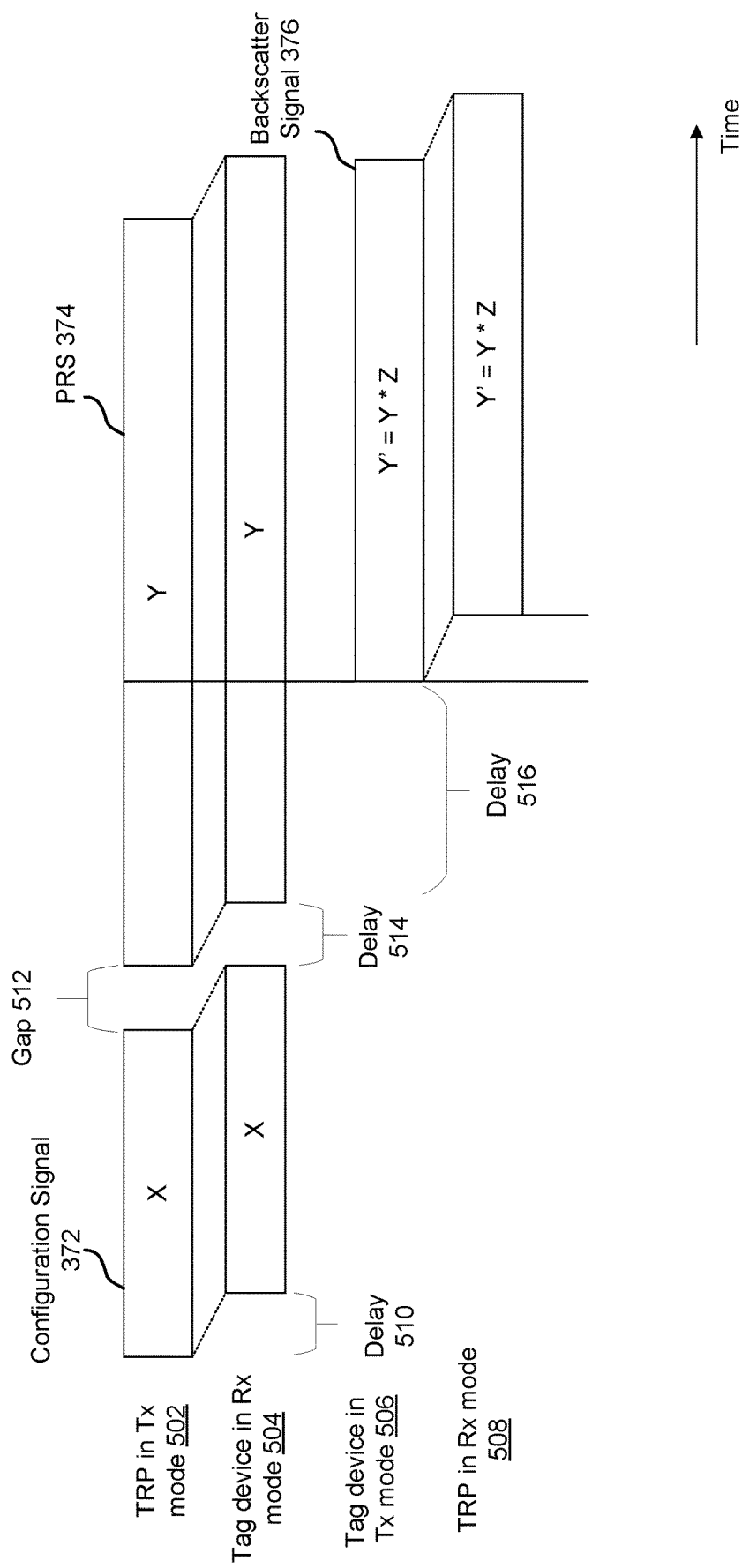
FIG. 5 is a conceptual diagram illustrating timing that supports backscatter-based positioning according to one or more aspects.

FIG. 5 is a conceptual diagram illustrating timing that supports backscatter-based positioning according to one or more aspects. Initially, a TRP, such as TRP 340, operates in Tx mode 502 to transmit configuration signal 372 (signal X) and PRS 374 (signal Y). A timing gap 512 may separate configuration signal 372 and PRS 374. For example, a period of time, corresponding to gap 512, may pass from a first time at which configuration signal 372 is transmitted and a second time at which PRS 374 is transmitted.

It is noted that TRP may transmit configuration signal X and PRS Y. Configuration signal X may provide a power-up (e.g., energy portion), addressing, or both. The addressing of configuration signal X may indicate a particular tag device that should wake up for backscatter transmission operations. PRS Y may include a source signal that carries timing information. The timing information is configured to be backscattered by the tag device to enable the TRP to compare the backscattered signal with transmission timing. In some implementations, PRS Y may be a wideband sequence, such as a CDMA type PN sequence with low auto-correlation.

A tag device, such as tag device 120, operating in Rx mode 504, may receive the configuration signal 372 and PRS 374. However, as depicted in FIG. 5, the tag device may receive the configuration signal 372 and PRS 374 with time delays 510, 514. Regarding time delay 514, there is no requirement on the relative locations of configuration signal X and PRS Y, other than PRS Y follows configuration signal X. Although time delay 514 is shown, in other implementations, there may be no time delay 514. Time delay 514 may account for the processing delay at tag device 120 to detect the addressing in configuration signal X and turn on or configure the backscattering circuitry of tag device 120. During that processing delay, tag device 120 will not backscatter and energy expended by tag device 120 for backscattering is wasted. In other words, time delay 514 enables power saving by tag device 120 and time delay 514 can be long enough such that PRS Y starts after the configuration signal X (and after the processing delay of tag device 120).

The tag device may process the configuration signal and the PRS, and a time to process the foregoing may correspond time delay 516. Moreover, in some implementations, some PRS data, may be lost due to processing delays. After conclusion of time delay 516, tag device operating in Tx mode 506 may be configured to transmit backscatter signal 376 (signal Y') that includes PRS (Y) modulated with modulation data (Z). Due to lost PRS data associated with processing delays, transmitted backscatter signal 376 may not include a portion of the PRS that is reflected. The TRP, operating in Rx mode 508, may receive backscatter signal 376 after time delay 516.

In some implementations, PRS 374 may include one or more data portions and one or more energy portions. During the one or more data portions, tag device 120 may reflect PRS 374 to generate backscatter signal 376. The backscatter signal 376 may be modulated based on the configuration signal 372. During the one or more energy portions, tag device 120 may harvest energy based on PRS 374. For example, tag device 120 may turn on backscatter during a data portion and may turn off backscatter during an energy portion. In some implementations, an on/off pattern or sequence may be standardized. In some implementations, modulation scheme 392, such as a scrambling sequence, may be defined for the whole positioning session including the data portion(s) and the energy portion(s) of PRS 374, but during the energy portion(s), nothing is reflected back from tag device 120.

FIG. 6 is a conceptual diagram depicting interference at a TRP in one or more aspects. In particular, the TRP, operating in a Rx mode, may experience self-interference 604, corresponding to $h_c c(t)$ as explained with reference to FIG. 3. The self-interference may occur at a frequency 602. Additionally, the TRP may experience environmental interference 606, such as from objects proximate to the tag device, such as static objects or moving objects. Environmental interference 606 may correspond to $\Sigma_i h_i c(t-t_i)$ as explained above with reference to FIG. 3. Backscatter signal without interference 610 may correspond to $h_b c(t-t_c) b(t-t_p)$ as described with reference to FIG. 3. As shown, backscatter signal 610 is frequency shifted as compared to self-interference 604.

Figure 7:
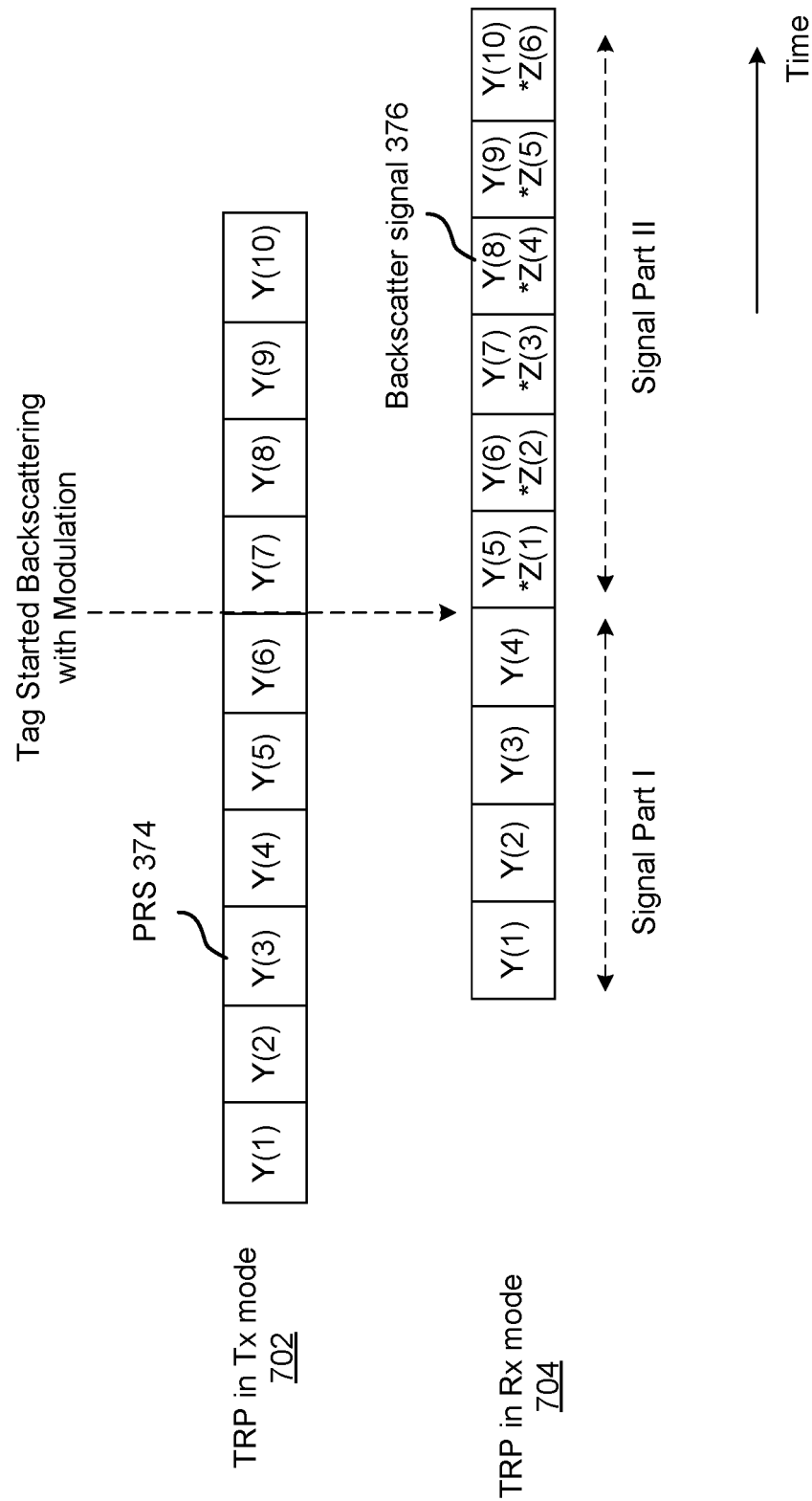
FIG. 7 is a conceptual diagram illustrating timing associated with backscatter-based positioning according to one or more aspects.

FIG. 7 is a conceptual diagram illustrating timing associated with backscatter-based positioning according to one or more aspects. In particular, FIG. 7 depicts a TRP, such as TRP 340, in Tx mode 702 and in Rx mode 704. In Tx mode 702, TRP may be configured to transmit PRS 374. PRS 374 may include a plurality of symbols Y(1) ... Y(10). Each symbol might denote a fixed time duration. For example, each of Y(1) ... Y(10) may denote a timeframe of 10 microseconds (μs); however, it is understood that the symbols may be any fixed timeframe.

The TRP, operating in Rx mode 704 may receive backscatter signal 376. In some implementations, the backscatter signal 376 is bipartite, including a first part and a second part. The first part may be a reflection of PRS 374 without manipulation by the tag device. For example, the first part may be the PRS 374, reflected by the tag device, without modulation, by the tag device, of the PRS 374 with modulation data received by the tag device via a configuration signal, such as configuration signal 372. However, the first part may include interference, such as described with reference to FIG. 7. The second part may include the PRS 374 (e.g., symbols of the PRS) modulated with modulation data (Z).

The TRP may be configured to use the first part (e.g., symbols Y(1) . . . Y(4)) corresponding to PRS 374) to evaluate self-interference, environmental interference, or a combination thereof. For example, the TRP may monitor a channel for backscatter signal 376 after transmitting the PRS 374 (e.g., monitor the channel for the second part of backscatter signal 376) and may use the first part to identify interference in the channel.

The TRP may be configured to use the second part for determining a RTT of PRS 374 and backscatter signal 376. To illustrate, the TRP may maintain a record (e.g., in memory 304) of a first time at which the TRP initiates transmission of PRS 374. Since each symbol corresponds to a fixed timeframe, the TRP may determine a second time at which TRP transmits symbol Y(7) of PRS 374. Additionally, the TRP may record a third time at which TRP receives symbol Y(5)*Z(1) of reflected backscatter signal 376. The TRP may be configured to compare the second time and the third time to thereby determine a RTT of PRS 374 and backscatter signal 376. Stated in a different manner, the tag device may begin backscattering modulation starting from Y(5) and the TRP can detect the signal part II by correlation with Y(5)*Z(1). The TRP may compare the current timing of Y(7) with received Y(5) (demodulated from Y(5)*Z(1)) and determine that the RTT is two units of time (e.g., a timeframe of Y). Based on the RTT (and other RTT measurements performed by other TRPs), a position of the tag device may be determined through TOA. TDOA, AoA, or combinations thereof.

In some implementations, backscatter signal 376 only includes a single part (e.g., the second part) in which PRS 374 is modulated with modulation data to generate backscatter signal 376 (denoted with symbols Y(5)*Z(1) . . . Y(10)*Z(6). In lieu of receiving a first part, TRP may be configured to monitor a channel for backscatter signal 376 (e.g., the PRS modulated with modulation data) after transmitting PRS 374. By monitoring the channel, the TRP may identify interference in the channel.

Figure 8:
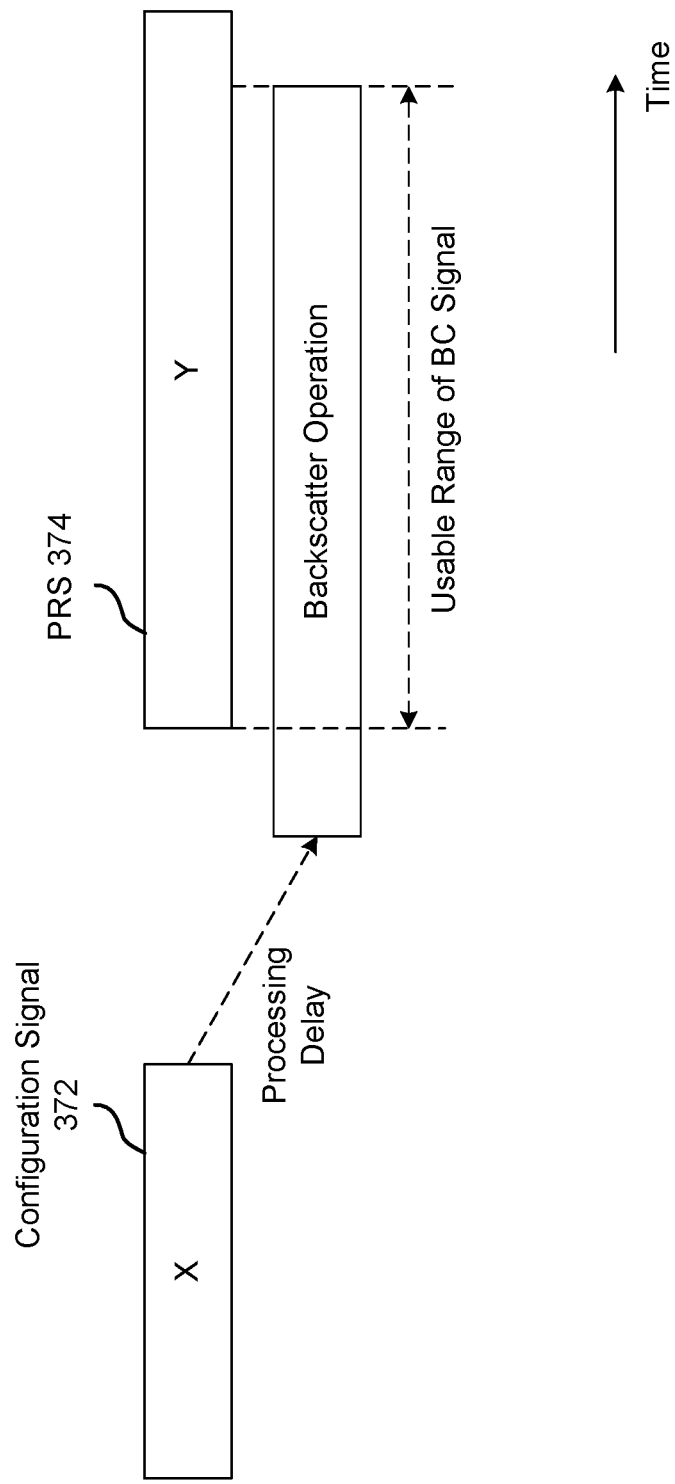
FIG. 8 is a conceptual diagram illustrating timing associated with backscatter-based positioning according to one or more aspects.

FIG. 8 is a conceptual diagram illustrating timing associated with backscatter-based positioning according to one or more aspects. Tag device 120 receives a configuration signal (X), followed by PRS (Y). However, before tag device 120 modulates the received PRS (Y) with the modulation data (e.g., during a backscatter operation), tag device 120 processes the configuration signal (X). For example, tag device 120 may process the configuration signal (X) by decoding an address contained in the configuration signal to determine whether to continue processing the configuration signal. In response to determining that the configuration signal is addressed to tag device 120, tag device 120 may continue to process the configuration signal. For example, tag device 120 may process a modulation scheme (e.g., modulation scheme 392) to derive modulation data, which tag device 120 may modulate with the PRS to generate a backscatter signal, such as backscatter signal 376.

While tag device 120 performs the foregoing processing of the configuration signal, tag device 120 may receive parts of the PRS. However, tag device 120 may only be configured to process the PRS after processing the configuration signal, with the result that only a portion of the PRS is usable, by tag device 120, to generate the backscatter signal by modulating modulation data with the PRS. The foregoing delay may be referred to as a tag processing delay period. Accordingly, in some implementations, tag device processes the configuration signal during a tag processing delay period and subsequently modulating the PRS with the modulation data after conclusion of the tag processing delay period during a modulation time period.

In some implementations, tag device 120 is configured to detect configuration signal (X). A power-up portion (e.g., a wake-up portion) of the configuration signal (X) may provide for or enable detection of the other portion of configuration signal (X). Alternatively, if tag device 120 includes its own power source, then a power-up portion of the configuration signal (X) may be unused. The other portion of configuration signal (X) may include addressing information so the correct tag device 120 processes PRS (Y).

In some implementations, after the detection of configuration signal (X), tag device 120 will activate backscatter transmission operations, subject to a processing delay. The backscatter transmission operations may be activated for a time period. The overlapping portion of the backscatter transmission operations and the incoming PRS (Y) may determine a usable portion of a backscatter signal that carries information to determine the RTT. It is noted that some level of alignment of PRS (Y) and the backscatter transmission operations may improve the efficiency of the transmission, there is no strict requirement for alignment and some waste is acceptable to handle unknown factors, such as an unknown processing delay time. Additionally, it is noted the techniques described herein may not require time sync (chip level) between the backscatter transmission operations and PRS (Y), resulting in a simple implementation (e.g., low overhead signaling and power consumption) at tag device 120.

Figure 9:
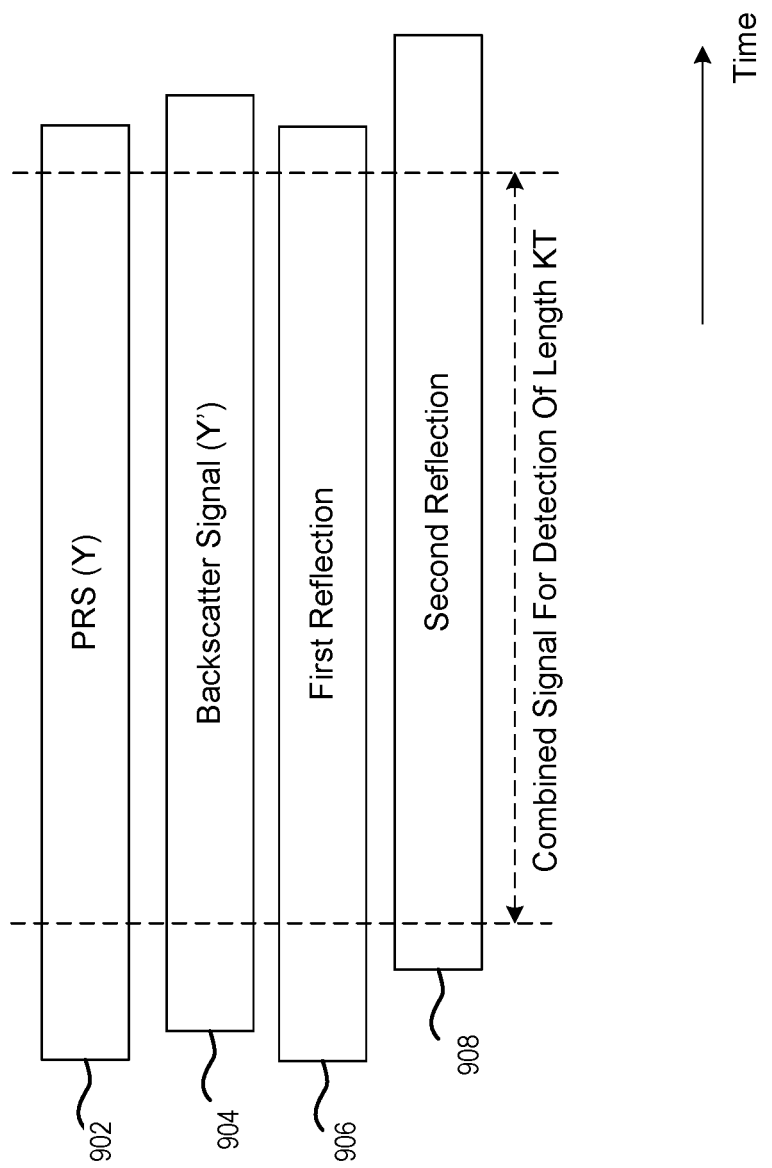
FIG. 9 is a conceptual diagram illustrating timing associated with backscatter-based positioning according to one or more aspects.

FIG. 9 is a conceptual diagram illustrating timing associated with backscatter-based positioning according to one or more aspects. FIG. 9 depicts PRS (Y), backscatter signal 904 (Y'), first reflection 906, and second reflection 908. In some implementations, PRS 902 may be a periodic signal with period T. Accordingly, to address timing offsets, such as tag processing delay periods, TRP may be configured to monitor for backscatter signal 904 during a timeframe set by a period T of PRS 902. For example, TRP may monitor for backscatter signal 904 during a timeframe equal to a integer multiple K of period T. In such implementations, the TRP may ignore the boundary effects (start and ending of signal and backscatter); rather, the TRP may process less than an entirety of the backscatter signal, such as a middle portion. It is noted that all samples of the backscatter signal may not be used by the TRP, but use of the monitoring window will reduce processing overhead. Additionally, sample loss may be minimized by properly control of the window location— e.g., with respect to transmission of the PRS (Y).

Figure 10:
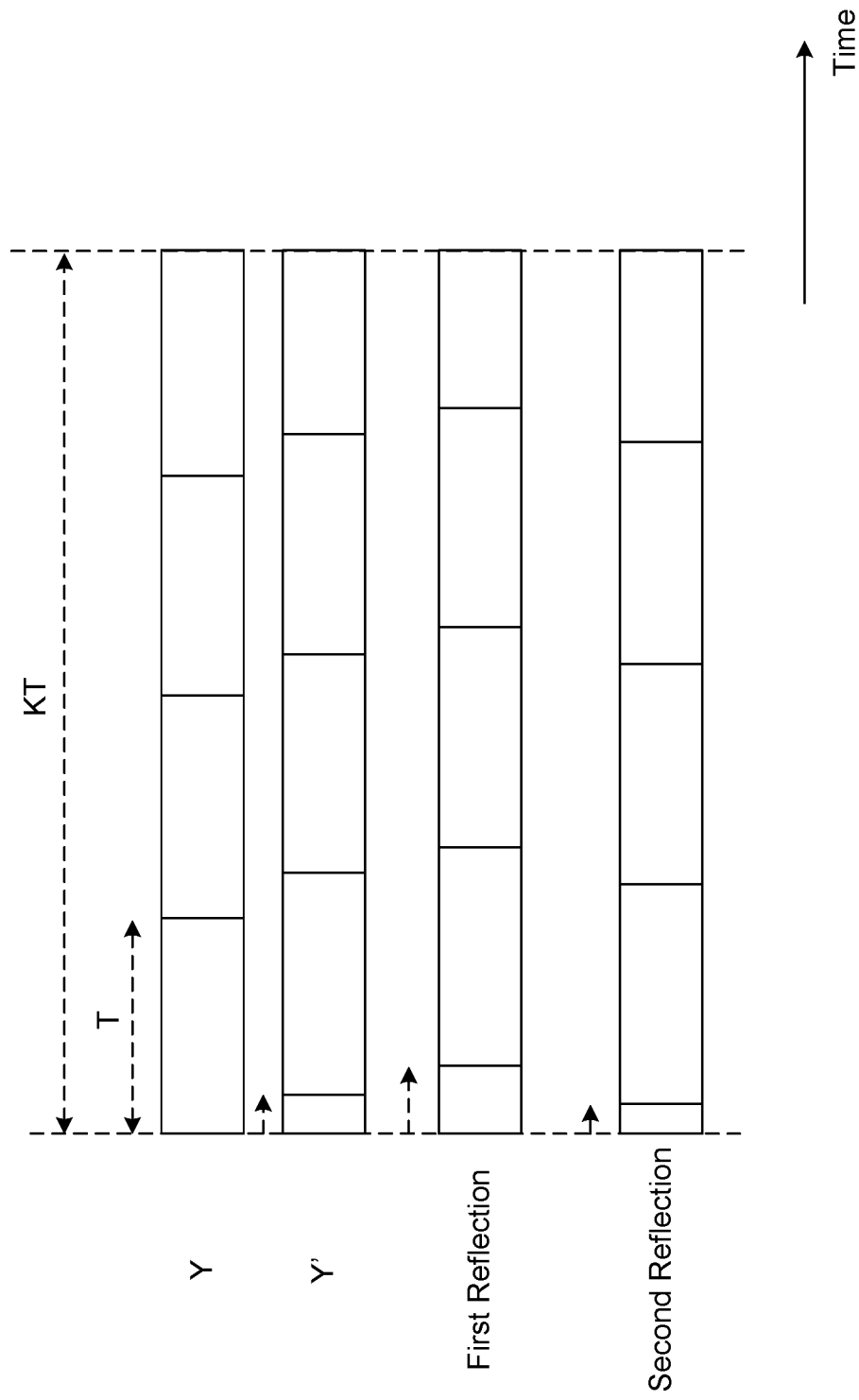
FIG. 10 is a conceptual diagram illustrating timing associated with backscatter-based positioning according to one or more aspects.

FIG. 10 is a conceptual diagram illustrating timing associated with backscatter-based positioning according to one or more aspects. As depicted in FIG. 10, a TRP may be configured to generate a PRS (Y) having a particular period T. In some implementations, the period T may be selected to accommodate the tag processing delay periods described with reference to FIG. 8. The TRP may be configured to monitor for backscatter signal (Y') over a window of time that is a integer (K) multiple of the period T. One or more reflections based on backscatter signal, such as a first reflection and a second reflection, may also be present during the monitoring. Based on different delays of backscatter signal (Y'), the first reflection, and the second reflection, each of backscatter signal (Y'), the first reflection, and the second reflection may have an offset (e.g., a time offset) with respect to PRS (Y).

The cyclic structure for PRS (Y) may help to reduce a complexity of correlating timings of PRS (Y) and the received backscatter signal (Y'). To illustrate, in some implementations, if PRS (Y) is periodic with period T, and the detection window length is a multiple (K) of the period, the RTT becomes a cyclic delay/shift. The cyclic shift detection can be done in frequency domain as phase ramp. It is noted that the period T can be selected to avoid any ambiguity and that T may be at least longer than the maximum RTT that is expected. In such implementations, the detection problem is still in the form $h_c c(t) + h_b c(t-t_c) b(t-t_b) + \Sigma_i h_i c(t-t_i)$; however, the delays may be cyclic and $t \in [0, KT]$.

Figure 11:
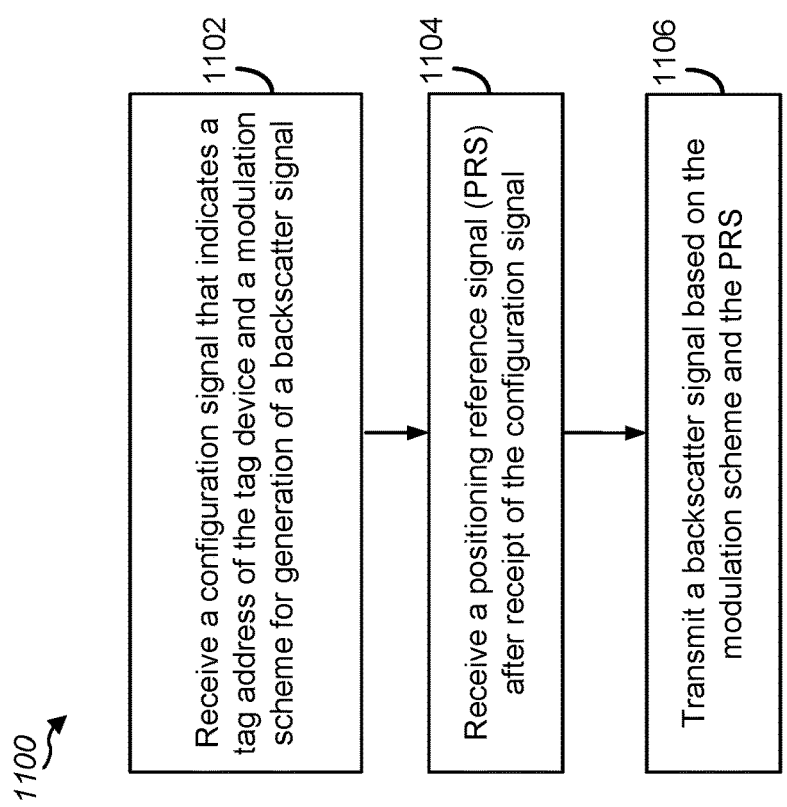
FIG. 11 is a flow diagram illustrating an example process that supports backscatter-based positioning according to one or more aspects.

FIG. 11 is a flow diagram illustrating an example process 1100 that supports backscatter-based positioning according to one or more aspects. Operations of process 1100 may be performed by a tag device, such as tag device 120 or a tag device described with reference to FIG. 4. For example, example operations (also referred to as "blocks") of process 1100 may enable tag device 120 to support backscatter-based positioning.

At block 1102, the tag device receives a configuration signal that indicates a tag address of the tag device and a modulation scheme for generation of a backscatter signal. For example, the configuration signal may include or correspond to configuration signal 372. The tag address may include or correspond to tag device information 309 or tag address 390. The modulation scheme may include or correspond to modulation scheme 392.

In some implementations, the configuration signal includes an energy signal. For example, the tag device may generate energy based on the energy signal. To illustrate, energy derived from the energy signal may be usable for powering one or more components of the tag device.

At block 1104, the tag device receives a PRS after receipt of the configuration signal. For example, the PRS may include or correspond to PRS 374.

At block 1106, the tag device transmits a backscatter signal based on the modulation scheme and the PRS. For example, the backscatter signal may include or correspond to backscatter signal 376. In some implementations, the tag device modulates, based on the modulation scheme, the PRS with modulation data to generate the backscatter signal. In some implementations, modulating the PRS with the tag data occurs after conclusion of the tag processing delay period during a modulation time period. In some implementations, the tag device transmits the backscatter signal after conclusion of a tag processing delay period.

In some implementations, the tag device determines that a tag address included in the configuration signal indicates the tag device. The tag device may generate the backscatter signal based on the modulation scheme in response to a determination that the tag address indicates the tag device. In some implementations, the tag device configures one or more components of the tag device based on the modulation scheme. For example, the one or more components may include or correspond to circuitry 351, transmitter 356, or receiver 358. In some implementations, the tag device processing the configuration signal during a tag processing delay period.

Figure 12:
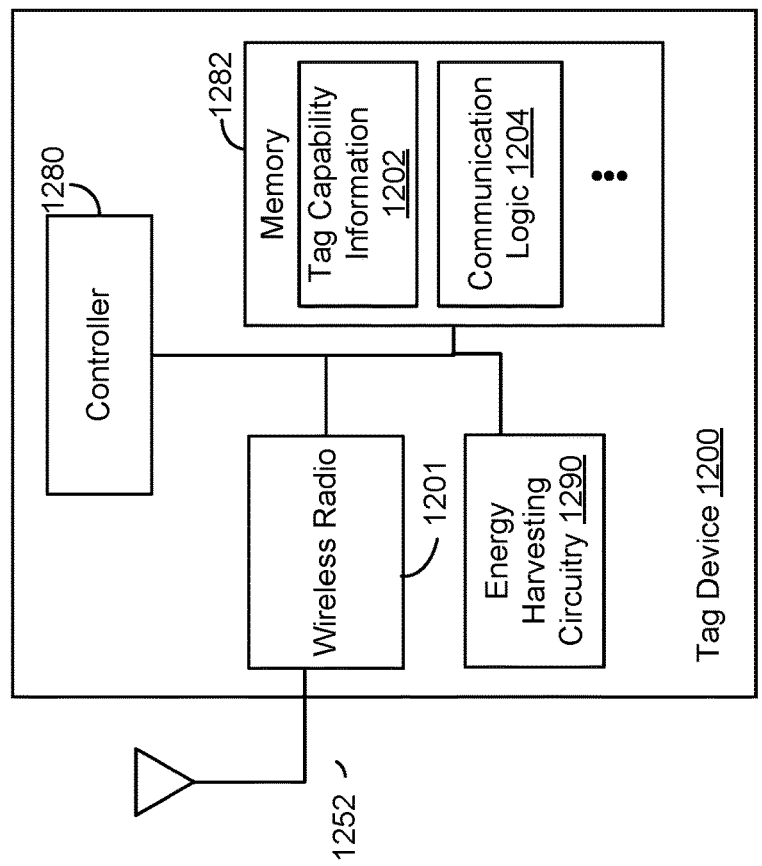
FIG. 12 is a block diagram of an example tag device that supports backscatter-based positioning according to one or more aspects.

FIG. 12 is a block diagram of an example tag device 1200 that supports backscatter-based positioning according to one or more aspects. Tag device 1200 may include or correspond to tag device 120. For example, tag device 1200 may include an RFID or IoT device. Additionally, or alternatively, tag device may include a passive device, a semi-passive device, or an active device.

Tag device 1200 may be configured to perform operations, including the blocks of a process described with reference to FIG. 11. In some implementations, tag device 1200 includes the structure, hardware, and components shown and described with reference to tag device 120. For example, tag device 1200 includes controller 1280, which operates to execute logic or computer instructions stored in memory 1282, as well as controlling the components of tag device 1200 that provide the features and functionality of tag device 1200. Controller 1280 and memory 1282 may include or correspond to circuitry 351. Tag device 1200, under control of controller 1280, transmits and receives signals via wireless radio 1201 and antenna 1252. In some implementations, wireless radio 1201 and antenna 1252 may include or correspond to transmitter 356, receiver 358, or a combination thereof. Wireless radio 1201 includes various components and hardware. As an illustrative, non-limiting example, tag device 1200 may include, as described with reference to FIG. 2, modulator and demodulators 254a-r, MIMO detector 256, receive processor 258, transmit processor 264, and TX MIMO processor 266.

Tag device 1200 also includes energy harvesting circuitry 1290. Energy harvesting circuitry 1290 may include or correspond to circuitry 351. Energy harvesting circuitry 1290 may include hardware (e.g., circuitry), software, or a combination thereof configured to harvest energy from an energy source for tag device 1200. For example, the energy source may include a solar energy source, a vibrational energy source, or a thermal energy source, as illustrative, non-limiting examples. Energy harvesting circuitry 1290 may be coupled to circuitry, such as controller 1280, memory 1282, wireless radio 1201, a power source of tag device 1200, or a combination thereof. In some implementations, the harvested energy may be used to charge a power source, such as a battery or capacitor. The power source may be coupled to controller 1280, memory 1282, wireless radio 1201, or a combination thereof. Additionally, or alternatively, the harvested energy may be configured to power one or more components of tag device 1200.

Figure 14:
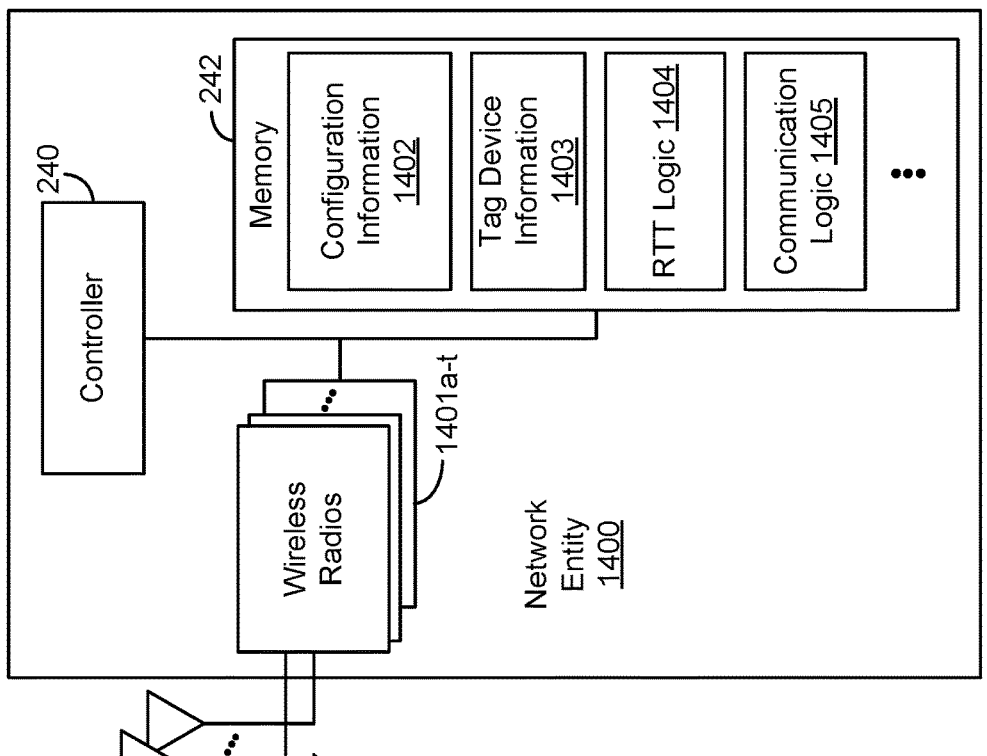
FIG. 14 is a block diagram of an example network entity that supports backscatter-based positioning according to one or more aspects.

As shown, memory 1282 may include tag capability information 1202 and communication logic 1204. Tag capability information 202 may include or correspond to tag device information 309. Communication logic 1204 may be configured to enable communication between tag device 1200 and one or more other devices. Tag device 1200 may receive signals from or transmit signals to one or more network entities, core network 130, LMF 131, reader device 121, TRP 340 or 405, UE 115, base station 105, or a network entity as illustrated in FIG. 14.

It is noted that tag device 1200 may include fewer or more components than described with respect to FIG. 12. For example, in some implementations, tag device 1200 may include a power storage device. As another example, tag device 1200 may not include controller 1280.

Figure 13:
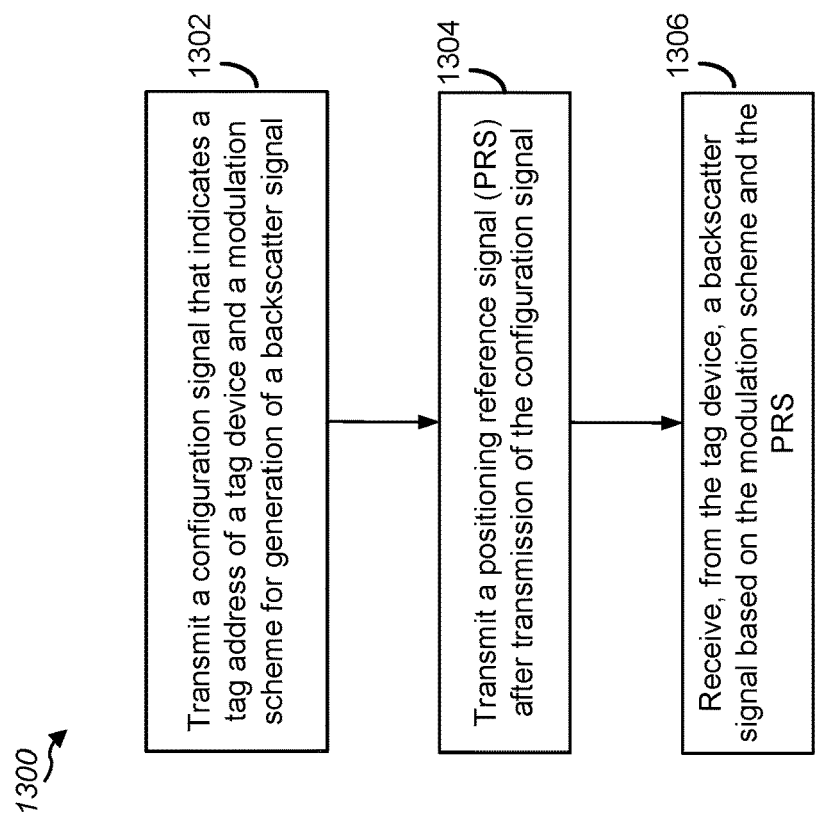
FIG. 13 is a flow diagram illustrating an example process that supports backscatter-based positioning according to one or more aspects.

FIG. 13 is a flow diagram illustrating an example process 1300 that supports backscatter-based positioning according to one or more aspects. Operations of process 1300 may be performed by a network entity, such as core network 130, LMF 131, reader device 121, TRP 340 or 405, UE 115, base station 105, or a network entity as described with reference to FIG. 14. For example, example operations of process 1300 may enable a TRP to support backscatter-based positioning.

At block 1302, the TRP transmits a configuration signal that indicates a tag address of a tag device and a modulation scheme for generation of a backscatter signal. For example, the configuration signal may include or correspond to configuration signal 372. The tag address may include or correspond to tag device information 309 or tag address 390. The modulation scheme may include or correspond to modulation scheme 392. The tag device may include or correspond to tag device 120. In some implementations, the configuration signal includes an energy signal configured to be converted into energy, by the tag device, for energy harvesting.

In some implementations, the tag address indicates a tag identifier of the tag device, a group identifier associated with the tag device, or a combination thereof. The modulation scheme may indicates a frequency shift parameter, a phase scrambling parameter, an on/off pattern, or a combination thereof. The on/off pattern may indicates one or more transitions of the tag device from a first state to a second state or from the second state to the first state. The first state may correspond to backscatter transmission state, and the second state may correspond to an energy harvesting state.

At block 1304, the TRP transmits a PRS after transmission of the configuration signal. For example, the PRS may include or correspond to PRS 374. In some implementations, the PRS includes timing information, a wideband sequence, is periodic, or a combination thereof. For example, the wideband sequence may include a code-division multiple access-pseudo random (CDMA-PN) sequence. Additionally or alternatively, the TRP may select a period of the PRS.

At block 1306, the TRP receives, from the tag device, a backscatter signal based on the modulation scheme and the PRS. For example, the backscatter signal may include or correspond to backscatter signal 376. In some implementations, the TRP correlates the backscatter signal and the PRS. The TRP may determine an RTT based on correlating the backscatter signal and the PRS.

In some implementations the TRP is configured to operate in a full duplex mode. Additionally, or alternatively, the TRP may be configured to operate asynchronously of the tag device.

In some implementations, the modulation scheme includes frequency shifting based on a frequency shift parameter, phase scrambling based on a phase scrambling parameter, modulation data, or a combination thereof. In some implementations, the TRP receives tag capability information corresponding to the tag device and determines a tag processing delay period based on the tag capability. In some implementations, transmission, by the TRP, of the PRS after the transmission of the configuration signal includes transmission of the PRS after conclusion of the tag processing delay period.

FIG. 14 is a block diagram of an example network entity 1400 that supports backscatter-based positioning according to one or more aspects. Network entity 1400 may include or correspond to core network 130, LMF 131, a reader device, TRP 340, 405, UE 115, or base station 105. Network entity 1400 may be configured to perform operations, including the blocks of process 1300 described with reference to FIG. 13. In some implementations, network entity 1400 includes the structure, hardware, and components shown and described with reference to base station 105 or UE 115 of FIG. 1 or 2. As an illustrative example, network entity 1400 may include controller 240, which operates to execute logic or computer instructions stored in memory 242, as well as controlling the components of network entity 1400 that provide the features and functionality of network entity 1400. Network entity 1400, under control of controller 240, transmits and receives signals via wireless radios 1401*a-t* and antennas 234*a-t*. Wireless radios 1401*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include configuration information 1402, tag device information 1403, RTT logic 1404, and communication logic 1405. Configuration information 1402 may include or correspond to information to generate configuration signal 372 and thus may include tag address 390, modulation scheme 392, or a combination thereof. Tag device information 1403 may include or correspond to information 306, tag device information 309, or both. RTT logic 1404 may be configured to determine an RTT based on a positioning reference signal (e.g., 374) and a backscatter signal (e.g., 376). Communication logic 1405 may be configured to enable communication between network entity 1400 and one or more other devices. Network entity 1400 may receive signals from or transmit signals to one or more devices, such as tag device 120, reader device 121, core network 130, LMF 131, TRP 340, 405, UE 115, base station 105, or another device.

It is noted that one or more blocks (or operations) described with reference to FIG. 11 or 13 may be combined with one or more blocks (or operations) described with reference to another of the figures. For example, one or more blocks (or operations) of FIG. 11 may be combined with one or more blocks (or operations) of FIG. 13. As another example, one or more blocks associated with FIG. 13 may be combined with one or more operations described with reference to FIGS. 4-10. As another example, one or more blocks associated with FIG. 11 or 13 may be combined with one or more blocks (or operations) associated with FIGS. 1-3. Additionally, or alternatively, one or more operations described above with reference to FIGS. 1-10 may be combined with one or more operations described with reference to FIG. 12 or 14.

In one or more aspects, techniques for supporting backscatter-based positioning may include additional aspects, such as any single aspect or any combination of aspects described below or in connection with one or more other processes or devices described elsewhere herein. In a first aspect, techniques for supporting backscatter-based positioning may include transmitting a configuration signal that indicates a tag address of a tag device and a modulation scheme for generation of a backscatter signal. The techniques may also include transmitting a positioning reference signal (PRS) after transmission of the configuration signal. The techniques further include receiving, from the tag device, a backscatter signal based on the modulation scheme and the PRS. In some examples, the techniques in the first aspect may be implemented in a method or process. In some other examples, the techniques of the first aspect may be implemented in a communication device or a communication system. For example, the communication device may include wireless communication device, such as a network entity, a core network, an LMF, a UE, a base station, a reader device, or a component thereof. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the configuration signal includes an energy signal configured to be converted into energy by the tag device for energy harvesting.

In a third aspect, in combination with the first aspect or the second aspect, the techniques further include the tag address indicates a tag identifier of the tag device, a group identifier associated with the tag device, or a combination thereof.

In a fourth aspect, in combination with one or more of the first aspect through the third aspect, the modulation scheme indicates a frequency shift parameter, a phase scrambling parameter, an on/off pattern, or a combination thereof.

In a fifth aspect in combination with the fourth aspect, the on/off pattern indicates one or more transitions of the tag device from a first state to a second state or from the second state to the first state.

In a sixth aspect, in combination with the fifth aspect, the first state corresponds to backscatter transmission state In a seventh aspect, in combination with the fifth aspect or the sixth aspect, the second state corresponds to an energy harvesting state.

In an eighth aspect, in combination with one or more of the first aspect through the seventh aspect, the PRS includes timing information, a wideband sequence, is periodic, or a combination thereof.

In a ninth aspect, in combination with the eighth aspect, the techniques further include selecting a period of the PRS.

In a tenth aspect, in combination with the ninth aspect, the wideband sequence includes a CDMA-PN sequence.

In an eleventh aspect, in combination with one or more of the first aspect through the tenth aspect, the techniques further include receiving tag capability information corresponding to the tag device.

In a twelfth aspect, in combination with the eleventh aspect, the techniques further include determining a tag processing delay period based on the tag capability.

In a thirteenth aspect, in combination with the twelfth aspect, to transmit the PRS after the transmission of the configuration signal, the techniques further include transmitting the PRS after conclusion of the tag processing delay period.

In a fourteenth aspect, in combination with one or more of the first aspect through the thirteenth aspect, the techniques further include correlating the backscatter signal and the PRS.

In a fifteenth aspect, in combination with the fourteenth aspect, the techniques further include determining an RTT based on correlating the backscatter signal and the PRS.

In a sixteenth aspect, in combination with one or more of the first aspect through the sixteenth aspect, the modulation scheme includes frequency shifting based on a frequency shift parameter, phase scrambling based on a phase scrambling parameter, modulation data, or a combination thereof.

In a seventeenth aspect, in combination with one or more of the first aspect through the sixteenth aspect, the TRP is configured to operate in a full duplex mode.

In an eighteenth aspect, in combination with the seventeenth aspect, the TRP and the tag device are configured to operate asynchronously of one another.

In a nineteenth aspect, in combination with one or more of the first aspect through the eighteenth aspect, the techniques further include monitoring a channel for the backscatter signal after transmitting the PRS.

In a twentieth aspect, in combination with the nineteenth aspect, identifying interference in the channel, where the interference includes self-interference, environmental interference, or a combination thereof.

In a twenty-first aspect, in combination with the nineteenth aspect or the twentieth aspect, the techniques further include updating the modulation scheme based on the interference to counteract the interference.

In a twenty-second aspect, in combination with one or more of the first aspect through the twenty-first aspect, the techniques further include monitoring, during a detection time window, for the backscatter signal.

In a twenty-third aspect, in combination with the twenty-second aspect, a duration of the time window is greater than a period of the PRS.

In a twenty-fourth aspect, in combination with the twenty-second aspect or the twenty-third aspect, the detection time window is configured based on a period of the PRS.

In one or more aspects, techniques for supporting backscatter-based positioning may include additional aspects, such as any single aspect or any combination of aspects described below or in connection with one or more other processes or devices described elsewhere herein. In a twenty-fifth aspect, techniques for supporting backscatter-based positioning may include receiving a configuration signal that indicates a tag address of the tag device and a modulation scheme for generation of a backscatter signal. The techniques may further include receiving a positioning reference signal (PRS) after receipt of the configuration signal. The techniques also include transmitting a backscatter signal based on the modulation scheme and the PRS. In some examples, the techniques in the twenty-fifth aspect may be implemented in a method or process. In some other examples, the techniques of the twenty-fifth aspect may be implemented in a wireless communication device, such as a tag device or IoT device, which may include a passive tag, a semi-passive tag, an active tag, a UE, an RFID, or a component thereof. In some examples, the wireless communication device may include circuitry, such as at least one processing unit or system (which may include an application processor, a modem or other components) and at least one memory device coupled to the processing unit, as illustrative, non-limiting examples. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a twenty-sixth aspect, in combination with the twenty-fifth aspect, the configuration signal includes an energy signal.

In a twenty-seventh aspect, in combination with the twenty-sixth aspect, the techniques further include generating energy based on the energy signal.

In a twenty-eighth aspect, in combination with the twenty-seventh aspect, the energy is useable for powering one or more components of the tag device.

In a twenty-ninth aspect, in combination with one or more of the twenty-fifth aspect through the twenty-eighth aspect, the techniques further include determining that the tag address included in the configuration signal indicates the tag device.

In a thirtieth aspect, in combination with one or more of the twenty-fifth aspect through the twenty-ninth aspect, the techniques further include generating the backscatter signal based on the modulation scheme in response to a determination that the tag address indicates the tag device.

In a thirty-first aspect, in combination with one or more of the twenty-fifth aspect through the thirtieth aspect, the techniques further include configuring one or more components of the tag device based on the modulation scheme.

In a thirty-second aspect, in combination with the thirty-first aspect, configuring the one or more components occurs during a tag processing delay period.

In a thirty-third aspect, in combination with the thirty-second aspect, transmitting the backscatter signal occurs after conclusion of the tag processing delay period.

In a thirty-fourth aspect, in combination with one or more of the twenty-fifth aspect through the thirty-third aspect, the techniques further include modulating, based on the modulation scheme, the PRS with modulation data to generate the backscatter signal.

In a thirty-fifth aspect, in combination with one or more of the twenty-fifth aspect through the thirty-fourth aspect, the techniques further include processing the configuration signal during a tag processing delay period.

In a thirty-sixth aspect, in combination with the thirty-fifth aspect, modulating the PRS with the modulation data occurs after conclusion of the tag processing delay period during a modulation time period.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-14 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a network entity, the method comprising:
   transmitting a configuration signal that indicates a tag address of a tag device and a modulation scheme for generation of a backscatter signal;
   transmitting a positioning reference signal (PRS) after transmission of the configuration signal;
   receiving, from the tag device, a backscatter signal based on the modulation scheme and the PRS;
   correlating the backscatter signal and the PRS; and
   determining a round trip time (RTT) based on correlating the backscatter signal and the PRS.

2. The method of claim 1, wherein
   the tag address indicates a tag identifier of the tag device, a group identifier associated with the tag device, or a combination thereof.

3. The method of claim 1, wherein:
   the modulation scheme indicates a phase scrambling parameter, an on/off pattern, or a combination thereof;
   the on/off pattern indicates one or more transitions of the tag device from a first state to a second state or from the second state to the first state,
   the first state corresponds to backscatter transmission state, and
   the second state corresponds to an energy harvesting state.

4. The method of claim 1, further comprising:
   selecting a period of the PRS, and
   wherein:
      the PRS includes timing information, a wideband sequence, is periodic, or a combination thereof; and the wideband sequence includes a code-division multiple access-pseudo random (CDMA-PN) sequence.

5. The method of claim 1, further comprising:
receiving tag capability information corresponding to the tag device; and
determining a tag processing delay period based on the tag capability, and
wherein transmitting the PRS after the transmission of the configuration signal includes transmitting the PRS after conclusion of the tag processing delay period.

6. The method of claim 1, wherein the modulation scheme includes:
frequency shifting based on a frequency shift parameter, phase scrambling based on a phase scrambling parameter, modulation data, or
a combination thereof.

7. The method of claim 1, wherein:
the network entity is configured to operate in a full duplex mode, and
the network entity and the tag device are configured to operate asynchronously of one another.

8. The method of claim 1, further comprising:
monitoring a channel for the backscatter signal after transmitting the PRS, the channel monitored according to a monitoring window having a duration less than a duration of the PRS;
identifying interference in the channel, wherein the interference includes self-interference, environmental interference, or a combination thereof; and
updating the modulation scheme based on the interference to counteract the interference.

9. The method of claim 1, further comprising:
monitoring, during a detection time window, for the backscatter signal, and
wherein a duration of the time window is greater than a period of the PRS, and
wherein the detection time window is configured based on a period of the PRS.

10. A network entity comprising:
at least one processor; and
a memory coupled to the at least one processor, the at least one processor configured to:
transmit a configuration signal that indicates a tag address of a tag device and a modulation scheme for generation of a backscatter signal;
transmit a positioning reference signal (PRS) after transmission of the configuration signal;
receive, from the tag device, a backscatter signal based on the modulation scheme and the PRS;
correlate the backscatter signal and the PRS; and
determine a round trip time (RTT) based on correlating the backscatter signal and the PRS.

11. The network entity of claim 10, wherein:
the tag address indicates a tag identifier of the tag device, a group identifier associated with the tag device, or a combination thereof.

12. The network entity of claim 10, wherein:
the modulation scheme indicates a phase scrambling parameter, an on/off pattern, or a combination thereof;
the on/off pattern indicates one or more transitions of the tag device from a first state to a second state or from the second state to the first state,
the first state corresponds to backscatter transmission state, and
the second state corresponds to an energy harvesting state.

13. The network entity of claim 10, wherein the at least one processor is further configured to:

select a period of the PRS, and
wherein:
the PRS includes timing information, a wideband sequence, is periodic, or a combination thereof; and
the wideband sequence includes a code-division multiple access-pseudo random (CDMA-PN) sequence.

14. The network entity of claim 10, wherein the at least one processor is further configured to:
receive tag capability information corresponding to the tag device; and
determine a tag processing delay period based on the tag capability, and
wherein the PRS is transmitted after the transmission of the configuration signal includes transmitting the PRS after conclusion of the tag processing delay period.

15. The network entity of claim 10, wherein the modulation scheme includes:
frequency shifting based on a frequency shift parameter, phase scrambling based on a phase scrambling parameter, modulation data, or
a combination thereof.

16. The network entity of claim 10, wherein:
the network entity is configured to operate in a full duplex mode, and
the network entity and the tag device are configured to operate asynchronously of one another.

17. The network entity of claim 10, wherein the at least one processor is further configured to:
monitor a channel for the backscatter signal after transmitting the PRS;
identify interference in the channel, wherein the interference includes self-interference, environmental interference, or a combination thereof; and
update the modulation scheme based on the interference to counteract the interference.

18. The network entity of claim 10, wherein the at least one processor is further configured to:
monitor, during a detection time window, for the backscatter signal, and
wherein a duration of the time window is greater than a period of the PRS, and
wherein the detection time window is configured based on a period of the PRS.

19. A method of wireless communication performed by a tag device, the method comprising:
receiving a configuration signal that indicates a tag address of the tag device and a modulation scheme for generation of a backscatter signal;
configuring one or more components of the tag device based on the modulation scheme, wherein configuring the one or more components occurs during a tag processing delay period;
receiving a positioning reference signal (PRS) after receipt of the configuration signal; and
transmitting a backscatter signal based on the modulation scheme and the PRS, wherein transmitting the backscatter signal occurs after conclusion of the tag processing delay period.

20. The method of claim 19, wherein:
the configuration signal includes an energy signal; and
energy generated based on the energy signal is useable for powering one or more components of the tag device.

21. The method of claim 19, further comprising:
determining that the tag address included in the configuration signal indicates the tag device; and generating the backscatter signal based on the modulation scheme in response to a determination that the tag address indicates the tag device.

22. The method of claim 19, further comprising:
modulating, based on the modulation scheme, the PRS with modulation data to generate the backscatter signal; and
processing the configuration signal during a tag processing delay period, and
wherein modulating the PRS with the modulation data occurs after conclusion of the tag processing delay period during a modulation time period.

23. A tag device comprising:
at least one processor; and
a memory coupled to the at least one processor, the at least one processor configured to:
  receive a configuration signal that indicates a tag address of the tag device and a modulation scheme for generation of a backscatter signal;
  configure one or more components of the tag device based on the modulation scheme, wherein configuring the one or more components occurs during a tag processing delay period;
  receive a positioning reference signal (PRS) after receipt of the configuration signal; and
  transmit a backscatter signal based on the modulation scheme and the PRS, wherein the backscatter signal is transmitted after conclusion of the tag processing delay period.

24. The tag device of claim 23, wherein:
the configuration signal includes an energy signal; and
energy generated based on the energy signal is useable for powering one or more components of the tag device.

25. The tag device of claim 23, wherein the at least one processor is further configured to:
  determine that the tag address included in the configuration signal indicates the tag device; and
  generate the backscatter signal based on the modulation scheme in response to a determination that the tag address indicates the tag device.

26. The tag device of claim 23, wherein the at least one processor is further configured to:
  modulate, based on the modulation scheme, the PRS with modulation data to generate the backscatter signal; and
  process the configuration signal during a tag processing delay period, and
  wherein the PRS is modulated with the modulation data after conclusion of the tag processing delay period during a modulation time period.

* * * * *